(12) United States Patent
Wong et al.

(10) Patent No.: US 12,409,606 B2
(45) Date of Patent: Sep. 9, 2025

(54) ADDITIVE MANUFACTURING FOR MEDICAL DEVICES

(71) Applicant: Medtronic, Inc., Minneapolis, MN (US)

(72) Inventors: Thomas A. Wong, Maple Grove, MN (US); Timothy M. Ramos, Blaine, MN (US); William J. Clemens, Fridley, MN (US); Kristin M. Johnson, Circle Pines, MN (US); Gregory N. Nesseth, Forest Lake, MN (US); Ryan E. Begley, Minneapolis, MN (US); Scott N. Tuominen, Columbia Heights, MN (US); Elyssa M. Edgeton, Andover, MN (US); Dina L. Williams, Andover, MN (US)

(73) Assignee: Medtronic, Inc., Minneapolis, MN (US)

( * ) Notice: Subject to any disclaimer, the term of this patent is extended or adjusted under 35 U.S.C. 154(b) by 199 days.

(21) Appl. No.: 18/219,939

(22) Filed: Jul. 10, 2023

(65) Prior Publication Data
US 2024/0009925 A1    Jan. 11, 2024

Related U.S. Application Data

(60) Provisional application No. 63/388,049, filed on Jul. 11, 2022.

(51) Int. Cl.
*B29C 64/321* (2017.01)
*B29C 64/118* (2017.01)
(Continued)

(52) U.S. Cl.
CPC .......... *B29C 64/321* (2017.08); *B29C 64/118* (2017.08); *B29C 64/295* (2017.08);
(Continued)

(58) Field of Classification Search
None
See application file for complete search history.

(56) References Cited

U.S. PATENT DOCUMENTS

| 10,254,499 B1* | 4/2019 | Cohen | G02B 6/50 |
| 2013/0121644 A1* | 5/2013 | White | G02B 6/25 |
| | | | 29/874 |

(Continued)

FOREIGN PATENT DOCUMENTS

| WO | WO-2022026771 A1 * | 2/2022 | ........... B29C 64/336 |
| WO | WO-2022026838 A1 * | 2/2022 | ........ A61M 25/0045 |

*Primary Examiner* — Yung-Sheng M Tsui
(74) *Attorney, Agent, or Firm* — Mueting Raasch Group

(57) ABSTRACT

An additive manufacturing system for producing a medical catheter or lead and a method thereof. The system including a heating cartridge defining an interior volume and at least one filament port. The system also including a heating element thermally coupled to the heating cartridge to heat the interior volume, a filament handling system to feed at least one filament through the at least one filament port, and a substrate handling system. The substrate handling system including a clamp to secure a portion of a substrate to be moved relative to the heating cartridge to apply a jacket to the substrate. In one or more embodiments, a subassembly is positioned on the substrate and has an electrode ring. The jacket printed to cover at least a portion of the subassembly and spaced apart from the electrode ring.

21 Claims, 14 Drawing Sheets

(51) Int. Cl.
  *B29C 64/295*   (2017.01)
  *B29C 64/40*    (2017.01)
  *B29L 31/00*        (2006.01)
  *B33Y 10/00*        (2015.01)
  *B33Y 30/00*        (2015.01)
  *B33Y 80/00*        (2015.01)

(52) U.S. Cl.
  CPC ....... *B29C 64/40* (2017.08); *B29L 2031/7542* (2013.01); *B33Y 10/00* (2014.12); *B33Y 30/00* (2014.12); *B33Y 80/00* (2014.12)

(56) References Cited

U.S. PATENT DOCUMENTS

| | | | |
|---|---|---|---|
| 2018/0154586 A1* | 6/2018 | Wang | B29C 64/218 |
| 2018/0304533 A1* | 10/2018 | Burnham | B29C 64/209 |
| 2021/0122115 A1 | 4/2021 | Ramos | |

* cited by examiner

ADDITIVE MANUFACTURING FOR MEDICAL DEVICES

RELATED APPLICATIONS

This application claims the benefit of U.S. Provisional Application Ser. No. 63/388,049, filed Jul. 11, 2022, the entire contents of each of which are incorporated herein by reference. The disclosure generally relates to medical devices and, in particular, additive manufacturing of medical devices, such as catheters and implantable stimulation leads.

Medical catheters and leads are commonly used to access vascular and other locations within a body and to perform various functions at those locations, for example, delivery catheters may be used to deliver medical devices, such as implantable medical leads. A number of such medical devices are designed to be navigated through tortuous paths in a human body, such as through a patient's vasculature. Medical catheters and leads may be designed to be sufficiently flexible to move through turns, or curves, in the vasculature yet sufficiently stiff, or resilient, to be pushed through the vasculature. In many cases, such as those involving cardiovascular vessels, the route to the treatment or deployment site may be tortuous and may present conflicting design considerations that may require compromises between dimensions, flexibilities, material selection, operational controls and the like. These contrasting properties can present challenges in designing and manufacturing catheters. Existing manufacturing processes, such as conventional extrusion, may also limit options in designing and manufacturing catheters.

SUMMARY

The techniques of the present disclosure generally relate to additive manufacturing of medical devices, such as catheters and leads, that allows for further customization of the medical devices by/providing an easier way to include components internal to the medial device. For example, a subassembly may be positioned on a substrate or mandrel and a layer printed thereover, thereby encapsulating the components located in the subassembly. These systems and techniques may allow for manufacturing more complex medical devices without increasing the complexity of manufacturing. Further, the systems and techniques described herein may include positioning a liner on the substrate or mandrel prior to printing such that the substrate or mandrel can easily move relative to the printed jacket. As such, in some embodiments, the substrate or mandrel may include a lead such that the jacket is printed around the lead and the lead still has flexibility relative to the jacket.

Additionally, the additive manufacturing systems may include components for holding the one or more substrates in position for printing thereon. For example, an inlet die of a heating cartridge through which the substrate passes may define opening(s) to guide the substrate(s) in position. Further, the system may include a clamp to hold the substrate(s) in position at an end of the substrate(s). Specifically, in one or more embodiments, there may be multiple substrates such that the inlet die and the clamp include a corresponding number of openings to receive the substrates.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
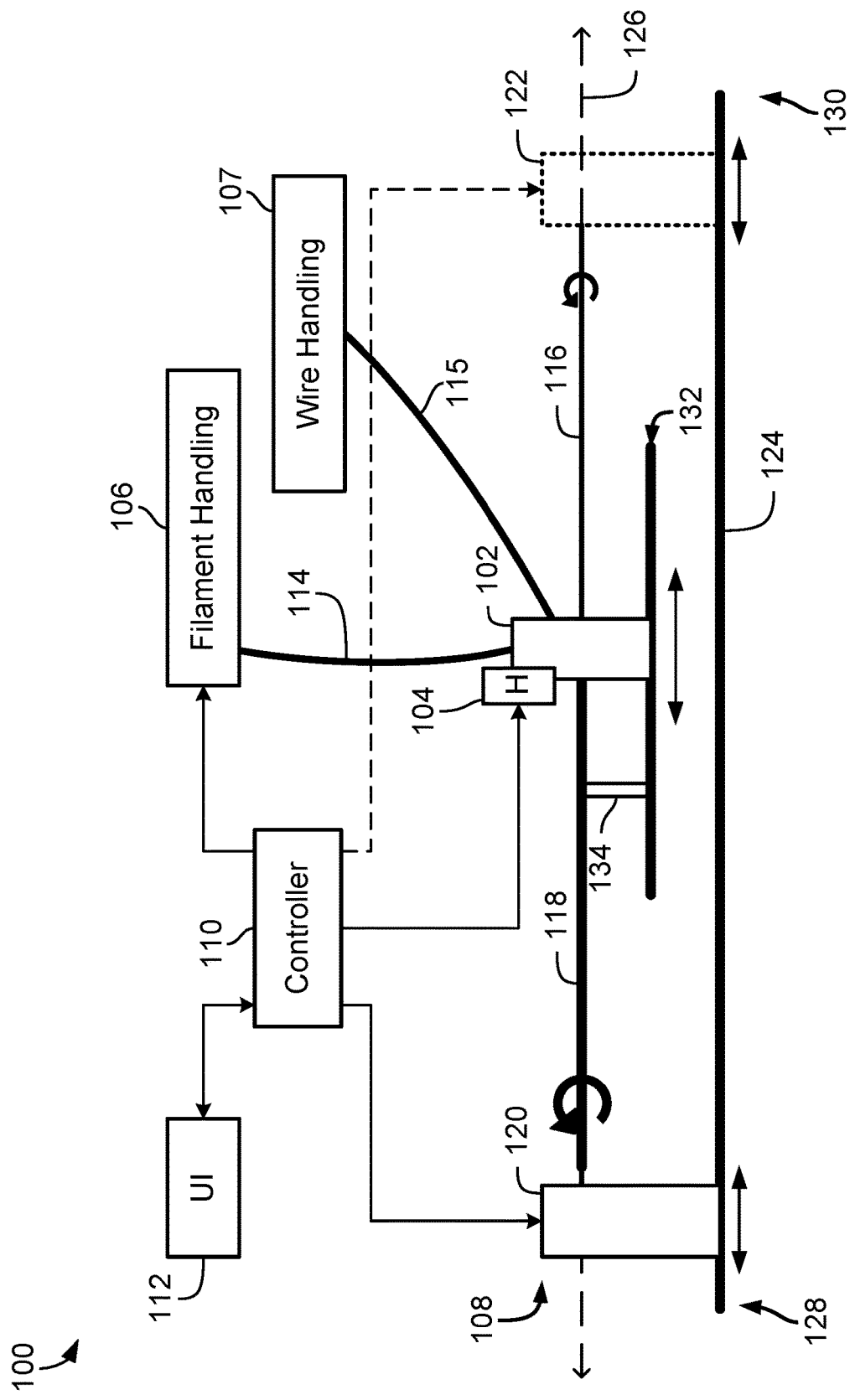
FIG. 1 is a conceptual diagram that illustrates one example of an additive manufacturing system according to the present disclosure.

The present disclosure generally provides additive manufacturing systems and methods for medical devices, such as catheters and leads, that allows for customization of the medical devices by using subassemblies and liners. For example, a jacket (e.g., a catheter jacket or insulation) may be printed over a subassembly located on a substrate/mandrel. It is noted that catheter jacket and printed jacket may be used interchangeably herein. The subassembly may include a variety of different components that can be embedded in the medical device by the printed jacket. For example, the subassembly may include electrical components such as, e.g., an electrode ring, coils, wires, etc. and the jacket may be printed over the subassembly to embed those components. Although, in some embodiments, the electrode ring may be left exposed (or any material printed on the electrode ring may be removed) to provide an operable electrode ring on the medical device.

Further, in one or more embodiments, the substrate/mandrel may include a liner (e.g., a harvestable liner) positioned over or covering the substrate/mandrel. Therefore, the jacket may be printed on the liner and the substrate/mandrel may be easily removed from the liner (e.g., leaving the printed jacket to form the medical device having a lumen extending therethrough). In one or more embodiments, the substrate/mandrel may be replaced by a lead or wire such that the jacket is printed over the lead or wire (e.g., with the liner positioned therebetween). Because the liner is present between the printed jacket and the lead/wire, the lead/wire may have flexibility within the printed jacket (e.g., the lead/wire may move relative to the printed jacket). In other words, the printed jacket may not be rigidly adhered to the lead or wire in such a way that the flexibility of the lead or wire is impeded thereby.

Further, the additive manufacturing systems may include components to assist in holding and guiding one or multiple substrates/mandrels. For example, a heating cartridge of the system may include an inlet die and the inlet die may be configured to help guide the substrates into and through the heating cartridge. Specifically, the inlet die may include one or more openings that correspond to the desired configuration of the substrates (e.g., upon which material may be printed to form a jacket). In other words, the configuration of the inlet die may define the internal structure of the medical device.

Additionally, the system may include a head stock to hold the substrate opposite the inlet die (e.g., such that the substrate extends between the inlet die and the head stock) and assist in moving the substrate. The head stock may include a clamp also having one or more openings that correspond to the desired configuration of the substrates. Further, the clamp may fix the substrate in the system such that the substrate may move relative to the heating cartridge. Specifically, the clamp may include a sleeve to receive the substrate and a collar to compress the sleeve onto the substrate (e.g., to restrict movement of the substrate). In other words, the collar may be moved relative to the sleeve to deform at least a portion of the sleeve such that the sleeve restricts movement of the substrate.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality. For example, a controller may be operably coupled to a resistive heating element to allow the controller to provide an electrical current to the heating element.

As used herein, any term related to position or orientation, such as "proximal," "distal," "end," "outer," "inner," and the like, refers to a relative position and does not limit the absolute orientation of an embodiment unless its context of usage clearly dictates otherwise.

All scientific and technical terms used herein have meanings commonly used in the art unless otherwise specified. The definitions provided herein are to facilitate understanding of certain terms used frequently herein and are not meant to limit the scope of the present disclosure.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

FIG. 1 shows one example of an additive manufacturing system 100 according to the present disclosure. The system 100 may be configured and used to create a medical device such as, e.g., a catheter, catheter component, lead, an assembly, etc. For example, consumable filament materials (e.g., having a variety of different hardness levels) may be melted to print and form components of the medical device (e.g., a printed jacket). The system 100 may be configured to operate a wide variety of process conditions to produce catheters, catheter components, leads, or assemblies using filaments or pellet to form resins of various hardness levels. In general, the system 100 defines a distal region 128, or distal end, and a proximal region 130, or proximal end. The system 100 may include a platform 124 including a rigid frame to support one or more components of the system.

As shown in the illustrated embodiment, the system 100 may include one or more components, such as a heating cartridge 102, a heating element 104, a filament handling system 106, an optional wire handling system 107, a substrate handling system 108, a controller 110, and a user interface 112. The filament handling system 106 may be operably coupled to the heating cartridge 102. The filament handling system 106 may provide one or more filaments 114 to the heating cartridge 102. The optional wire handling system 107 may be used to provide one or more wires 115 to the heating cartridge 102. The heating element 104 may be operably coupled, or thermally coupled, to the heating cartridge 102. The heating element 104 may provide heat to melt filament material in the heating cartridge 102 from the one or more filaments 114 provided by the filament handling system 106. The optional wires 115 may not be melted by the heating cartridge 102. The substrate handling system 108 may be operably coupled to the heating cartridge 102. The substrate handling system 108 may provide a substrate 116 that extends through the heating cartridge 102. Melted filament material located in the heating cartridge 102 may be applied to the substrate 116. The substrate 116 or the heating cartridge 102 may be moved (e.g., translated or rotated) relative to the other by the substrate handling system 108. Specifically, the substrate handling system 108 may be used to move the substrate 116 or the heating cartridge 102 relative to the other to cover the substrate 116 with the melted filament material to form a jacket 118. Further, in one or more embodiments, the optional wires 115 may be incorporated into the jacket 118 (e.g., molded into, bedded within, etc.).

The substrate 116 may also be described as a mandrel or rod. The jacket 118 may be formed or deposited around the substrate 116. In some embodiments, the jacket 118 may be formed concentrically around the substrate 116. In one example, the jacket 118 is formed concentrically and centered around the substrate 116.

Figure 10:
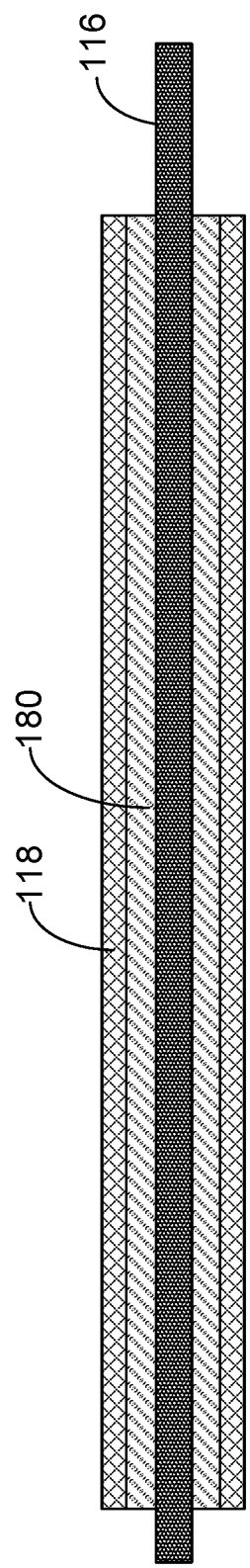
FIG. 10 is a conceptual diagram that illustrates one example of a catheter that may be manufactured with a liner using, for example, the additive manufacturing system of FIG. 1.

When the system 100 is used to make a catheter or catheter component, the jacket 118 may be described as a printed or catheter jacket. Some or all of the substrate 116 may be removed or separated from the jacket 118 and the remaining structure coupled to the jacket may form the catheter or catheter component, such as a sheath. One example of a catheter that may be formed by the system 100 is shown in FIG. 10.

The substrate 116 may be formed of any suitable material capable of allowing melted filament material to be formed thereon. In some embodiments, the substrate 116 is formed of a material that melts at a higher temperature than any of the filaments 114. One example of a material that may be used to form the substrate 116 includes stainless steel.

The controller 110 may be operably coupled to one or more of the heating element 104, the filament handling system 106, the substrate handling system 108, and the user interface 112. The controller 110 may activate, or initiate or otherwise "turn on," the heating element 104 to provide heat to the heating cartridge 102 to melt the filament material located therein. Further, the controller 110 may control or command one or more motors or actuators of various portions of the system 100. Furthermore, the controller 110 may control one or more motors or actuators of the filament handling system 106 to provide one or more filaments 114. Further, the controller 110 may control one or more motors or actuators of the substrate handling system 108 to move one or both of the heating cartridge 102 or the substrate 116 relative to one another. Further still, the controller 110 may send or receive data to the user interface 112, for example, to display information or to receive user commands. Control of the components operably coupled to the controller 110 may be determined based on user commands received by the user interface 112. In some embodiments, the user commands may be provided in the form of a machine-readable code or coding language.

Any suitable implementation may be used to provide the substrate handling system 108. In some embodiments, the substrate handling system 108 may include one or more of a head stock 120, an optional tail stock 122, and one or more motors coupled to or included in the head stock or tail stock. One or both of the head stock 120 and the tail stock 122 may be coupled to the platform 124. A stock may be defined as a structure that holds or secures the substrate 116 during formation of the jacket 118. The head stock 120 is defined as the stock closest to the end of the substrate 116 where formation of the jacket 118 begins in the formation process. In the illustrated embodiment, the jacket 118 is shown proximal to the head stock 120 and distal to the heating cartridge 102.

Figure 3:
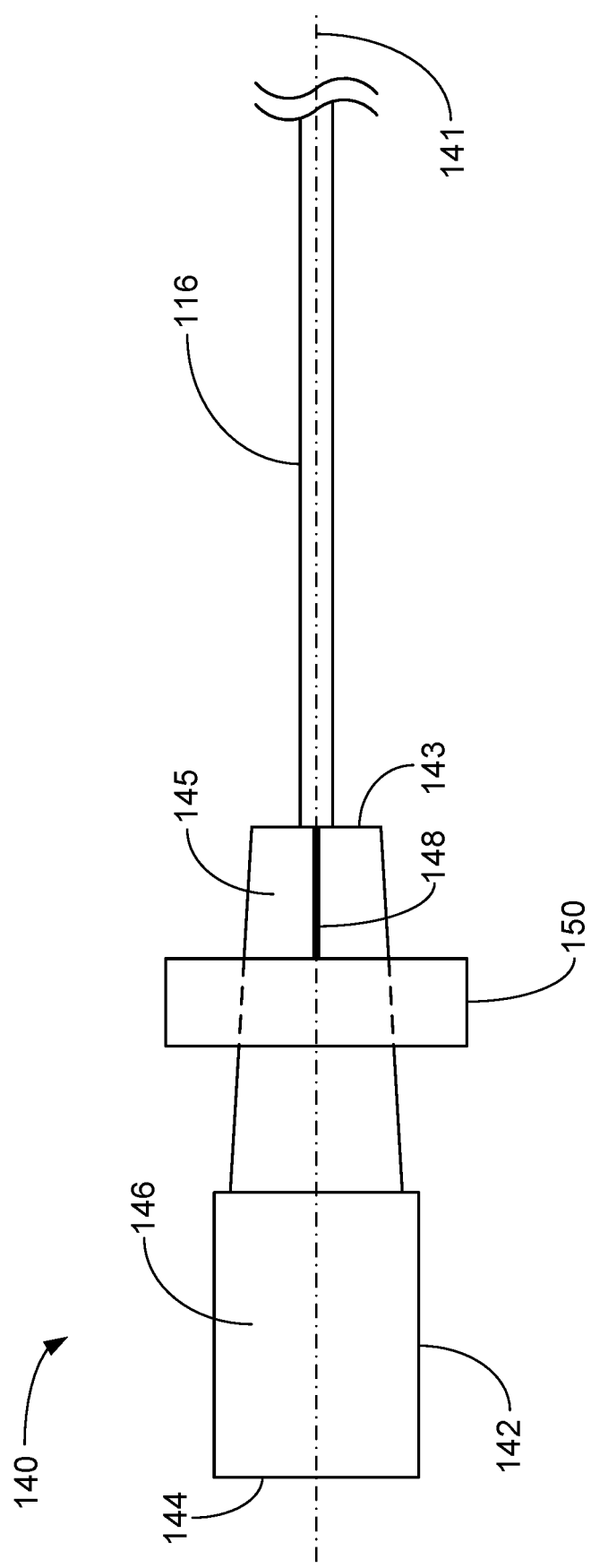
FIG. 3 is a conceptual diagram that illustrates one example of clamp attached to a substrate for use with, for example, the additive manufacturing system of FIG. 1.

When the substrate 116 is secured by one or both stocks 120, 122, the substrate is generally positioned to pass through a substrate channel defined by the heating cartridge 102. One or both stocks 120, 122 may include a clamp or other securing components to selectively hold the substrate 116. For example, as shown in FIG. 3, the clamp 140 may include a sleeve 142 and a collar 150. The elongate substrate 116 may extend through the sleeve 142 (e.g., via an opening extending through the sleeve 142). Further, the collar 150 may be configured to move the sleeve 142 relative to the elongate substrate 116 to, e.g., restrict movement of the substrate 116. In other words, the collar 150 may interact with the sleeve 142 to clamp the substrate 116 (e.g., into the head stock 120). As such, the collar 150 may engage the sleeve 142 to restrict or prevent movement of the substrate 116 and the collar 150 may disengage with the sleeve 142 such that the substrate 116 can move relative to the sleeve 142. The clamp 140 may be included in one or both of the head stock 120 and the tail stock 122.

The collar 150 may interact with the sleeve 142 to retain the substrate 116 in any suitable way. For example, the collar 150 may define an inner hole 152 (e.g., as shown in FIG. 4B) to receive the sleeve 142. The collar 150 may be configured to slide along the sleeve 142 to move at least a portion of the sleeve 142 to compress the sleeve 142 against the substrate 116 and restrict movement of the substrate 116 relative to the sleeve 142. In other words, sliding the collar 150 onto the sleeve 142 may deform the sleeve 142 such that the sleeve 142 compresses against the substrate 116.

Figure 4A:
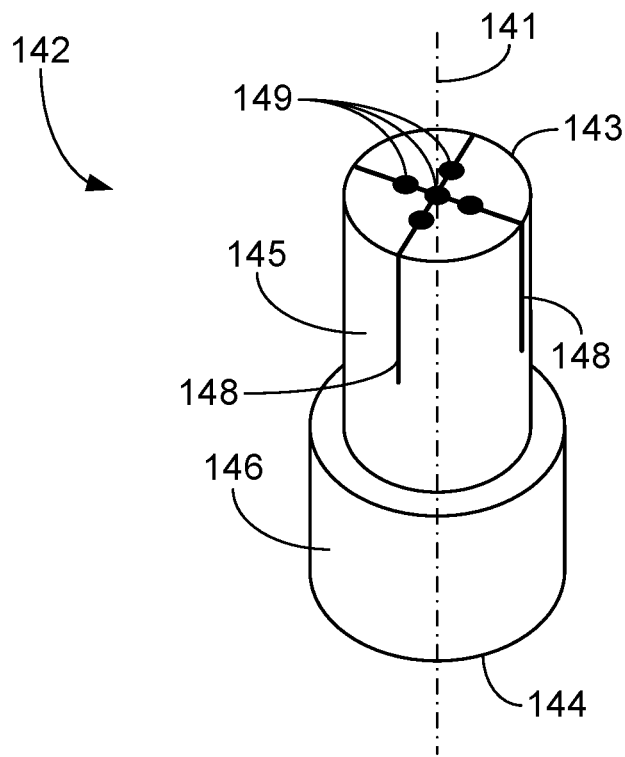
FIG. 4A is a perspective view of one example of a sleeve of the illustrative clamp of FIG. 3.
Figure 4B:
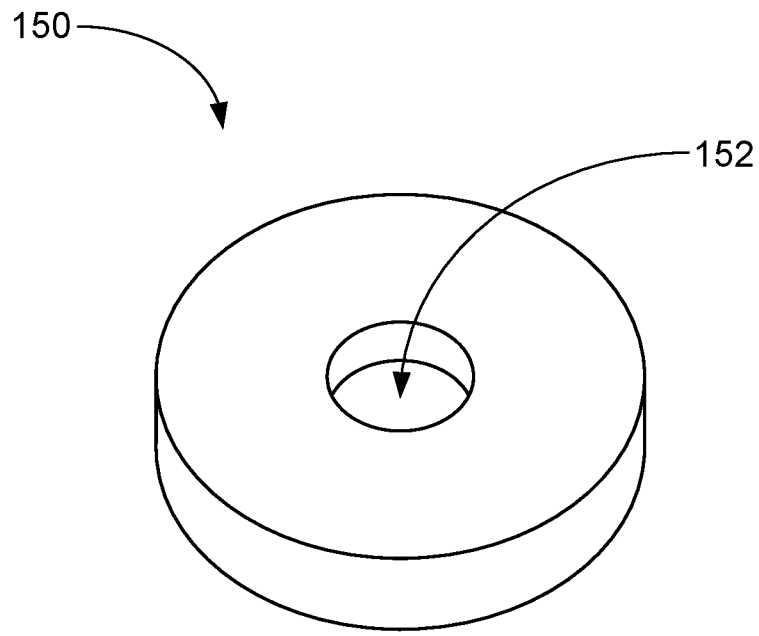
FIG. 4B is a perspective view of one example of a collar of the illustrative clamp of FIG. 3.

Specifically, the sleeve 142 may include a deformable portion 145 and a rigid portion 146 arranged along a longitudinal axis 141 (e.g., as shown in FIG. 4A). Further, the sleeve 142 may extend between a first end 143 and a second end 144 along the longitudinal axis 141. The deformable portion 145 may be located proximate the first end 143 of the sleeve 142 and the rigid portion 146 may be located proximate the second end 144 of the sleeve 142. The collar 150 may be configured to slide onto the deformable portion 145 (e.g., from the first end 143) and move the deformable portion 145 to compress the sleeve 142 onto the substrate 116 such that movement of the substrate 116 relative to the sleeve 142 is restricted. In other words, the collar 150 may apply a compressing force on the deformable portion 145 of the sleeve 142 such that the deformable portion may apply a compressing force on the substrate 116.

The deformable portion 145 of the sleeve 142 may be deformable in any suitable way. For example, as shown in FIGS. 3 and 4A, the sleeve 142 may define one or more slots 148 through the deformable portion 145. The one or more slots 148 may extend through the sleeve 142 along a plane in which the longitudinal axis 141 lies. The one or more slots 148 define an absence of material of the sleeve 142 such that portions of the sleeve 142 on either side of the one or more slots 148 may compress towards one another (e.g., towards the gap defined by the one or more slots 148) when a force is applied inward on the outer surface. Therefore, the portions of the sleeve 142 on opposite sides of the one or more slots 148 may move to compress or squeeze on the substrate 116 when the collar 150 is slid over the sleeve 142 (e.g., the deformable portion 145).

The one or more slots 148 may extend from the first end 143 of the sleeve 142 and towards the rigid portion 146 along the longitudinal axis 141. The one or more slots 148 may extend for the entire length of the deformable portion 145 of the sleeve 142 or for a length less than the entire deformable portion 145 (e.g., along the longitudinal axis 141). The one or more slots 148 may not extend within the rigid portion 146 of the sleeve 142.

Additionally, in one or more embodiments, the sleeve 142 (e.g., an outer surface of the sleeve 142) may define an increasing taper from an end (e.g., the first end 143) of the sleeve 142 as shown in FIG. 3. The taper may define any suitable angle to the longitudinal axis 141. In one or more embodiments, the outer surface of the sleeve 142 may define no taper and extend parallel to the longitudinal axis 141. The inner hole 152 of the collar 150 may define a substantially fixed diameter such that when the collar 150 is slid over the sleeve 142 from the end (e.g., the first end 143), the collar 150 may compress the sleeve 142 as the collar 150 moves further onto the sleeve 142 (e.g., as the collar 150 progresses over the increased taper of the sleeve 142). In other words, as the collar 150 moves along an increased diameter (e.g., because of the taper) of the sleeve 142, the collar 150 may apply a force to the outer surface of the sleeve 142 (e.g., the deformable portion 145) and compress the deformable portion 145 of the sleeve 142 (e.g., because of the one or more slots 148). The compression of the sleeve 142 may then be transferred to compression of the substrate 116 passing through the sleeve 142 to maintain the substrate 116 in place.

The collar 150 may be positioned on the sleeve 142 in any suitable way. For example, the collar 150 may be slid onto the sleeve 142 manually or through the use of a motor, as described herein. The substrate 116 may be inserted into the opening 149 of the sleeve 142 and the collar 150 may be slid onto the sleeve 142 to engage the clamp 140 and restrict movement of the substrate 116 (e.g., relative to the clamp 140). Also, the collar 150 may be slid off of the sleeve 142 to disengage the clamp 140 and allow movement of the substrate 116 (e.g., relative to the clamp 140).

The clamp 140 (e.g., the sleeve 142) may define a plurality of openings 149 configured to receive a plurality of substrates 116, as shown in FIG. 4A. In other words, the sleeve 142 may include any number of openings 149 to correspond to the desired number of substrates 116. For example, as shown in FIG. 4A, the sleeve 142 defines five openings 149 to receive five substrates 116. Therefore, in such embodiments, melted filament material may be printed on the five substrates to form a device having five lumens (e.g., corresponding to the substrates 116). The openings 149 of the sleeve 142 may assist in maintaining spatial orientation of the plurality of substrates 116 to form a more consistent resulting catheter or device.

The sleeve 142 may define any suitable number of openings 149. Further, the one or more slots 148 may align with the openings 149 (e.g., extending through a center of the openings 149) so that the sleeve 142 may be compressed to restrict movement of the substrate 116 extending through the corresponding opening 149. In other words, each opening 149 may have two separate portions of the sleeve 142 that move relative to one another and compress or squeeze a substrate 116 in the opening 149. Further, the one or more slots 148 may pass through multiple openings 149. Therefore, each opening 149 may include at least one slot 148 extending therethrough to assist in clamping the substrates 116.

Further, the clamp 140 (e.g., the sleeve 142 and/or the collar 150) may be operably coupled to a substrate motor. In some embodiments, the substrate motor may be used to control engaging and disengaging of the clamp 140. Referring back to FIG. 1, in some embodiments, the substrate motor may be used to rotate the substrate 116 in a clockwise or counterclockwise direction about a longitudinal axis 126. For example, a translation motor may be operably coupled between a stock 120, 122 and the platform 124. In some embodiments, the translation motor may be used to translate the stock 120, 122 in a longitudinal direction along the longitudinal axis 126. In some embodiments, the translation motor also may be used to translate the stock 120, 122 in a lateral direction different than the longitudinal axis 126. The lateral direction may be oriented substantially orthogonal, or perpendicular, to the longitudinal axis 126.

In some embodiments, the substrate handling system 108 may be configured to move the head stock 120 at least in a longitudinal direction (for example, parallel to the longitudinal axis 126) relative to the platform 124. The substrate 116 may be fed through the substrate channel of the heating cartridge 102 by movement of the head stock 120 relative to the platform 124. A distal portion of the substrate 116 may be clamped into the head stock 120 as described herein. The head stock 120 may be positioned close to the heating cartridge 102 at the beginning of the jacket formation process. The head stock 120 may move distally away from the heating cartridge 102, for example, in a direction parallel to the longitudinal axis 126. In other words, the head stock 120 may move toward the distal region 128 of the system 100 while pulling the secured substrate 116 through the heating cartridge 102. As the substrate 116 passes through the heating cartridge 102, melted filament material from the filament 114 may be formed or deposited onto the substrate 116 to form the jacket 118. The heating cartridge 102 may be stationary relative to the platform 124. In some embodiments, the tail stock 122 may be omitted.

In some embodiments, the substrate handling system 108 may be configured to move the heating cartridge 102 at least in a longitudinal direction (along the longitudinal axis 126) relative to the platform 124. The substrate 116 may be fed through the substrate channel of the heating cartridge 102. A distal portion of the substrate 116 may be clamped into the head stock 120 as described herein. Further, in one or more embodiments, a proximal portion of the substrate 116 may be clamped into the tail stock 122. In one example, the heating cartridge 102 may be positioned relatively close to the head stock 120 at the beginning of the jacket formation process. The heating cartridge 102 may move proximally away from the head stock 120. The heating cartridge 102 may move toward the proximal region 130 of the system 100. As the heating cartridge 102 passes over the substrate 116, melted filament material may be deposited onto the substrate 116 to form a jacket 118. The head stock 120 and the tail stock 122 may be stationary relative to the platform 124. In another example, the heating cartridge 102 may start near the tail stock 122 and move toward the distal region 128.

In one or more embodiments, the heating cartridge 102 may make multiple passes along the substrate 116 to form more than one jacket or layer. For example, once the heating cartridge 102 moves along the length of the substrate 116 to form a first jacket, the heating cartridge 102 may move along the length of the substrate 116 again and begin forming a second jacket (e.g., forming an inner layer and a middle/outer layer or jacket). Further, before forming the second jacket, a variety of different components may be positioned on the first jacket. Further yet, in one or more embodiments, the heating cartridge 102 may make more than two passes to form any suitable number of layers or jackets. Therefore, the resulting device (e.g., formed by multiple layers or jackets) may allow for changes along the component radially or a non-symmetrical application relative to the cross-section.

One or more motors of the substrate handling system 108 may be used to rotate one or both of the substrate 116 and the heating cartridge 102 relative to one another. In some embodiments, only the substrate 116 may be rotated about the longitudinal axis 126. In some embodiments, only the heating cartridge 102 may be rotated about the longitudinal axis 126. In some embodiments, both the substrate 116 and the heating cartridge 102 may be rotated about the longitudinal axis 126.

The heating cartridge 102 may be part of an assembly 132. The assembly 132 may be coupled to the platform 124. In some embodiments, one or more motors of the substrate handling system 108 may be coupled between assembly 132 and the platform 124 to move (e.g., translate or rotate) the assembly 132, including the heating cartridge 102, relative to the platform 124 or the substrate 116. In some embodiments, one or more motors of the substrate handling system 108 may be coupled between a frame of the assembly 132 and the heating cartridge 102 to move (e.g., translate or rotate) the heating cartridge relative to the platform 124.

In some embodiments, the substrate 116 may be rotated about the longitudinal axis 126 relative to the heating cartridge 102 to facilitate forming certain structures of the jacket 118. In one example, the substrate 116 may be rotated by one or both of the head stock 120 and the tail stock 122 of the substrate handling system 108. In another example, the heating cartridge 102 or subassembly 132 may be rotated by the substrate handling system 108.

The system 100 may include one or more concentricity guides 134. The concentricity guide 134 may facilitate adjustments to the concentricity of the jacket 118 around the substrate 116 before or after the substrate passes through the heating cartridge 102. The concentricity guide 134 may be longitudinally spaced from the heating cartridge 102. In some embodiments, the spacing may be greater than or equal to 1, 2, 3, 4, or 5 cm. The spacing may be sufficient to allow the jacket 118 to cool down and no longer be deformable. In some embodiments, one or more concentricity guides 134 may be positioned distal to the heating cartridge 102 and to engage the jacket 118. In some embodiments, one or more concentricity guides 134 may be positioned proximal to the heating cartridge 102 to engage the substrate 116. The concentricity guide 134 may mitigate drooping of the substrate 116 and may mitigate susceptibility to eccentricity in the alignment of the stock 120, 122 and the heating cartridge 102.

Any suitable implementation may be used to provide the filament handling system 106. One or more filaments 114 may be loaded into the filament handling system 106. For example, filaments 114 may be provided in the form of wound coils. Filaments 114 may be fed to the heating cartridge 102 by the filament handling system 106. In some embodiments, the filament handling system 106 may include one, two, or more pinch rollers to engage the one or more filaments 114. In some embodiments, the filament handling system 106 may include one or more motors. The one or more motors may be coupled to the one or more pinch rollers to control rotation of the pinch rollers. The force exerted by the motors onto the pinch rollers and thus onto the one or more filaments 114 may be controlled by the controller 110.

In some embodiments, the filament handling system 106 may be configured to feed the filaments 114 including at least a first filament and a second filament. The jacket 118 may be formed from the material of one or both of the filaments 114. The filament handling system 106 may be capable of selectively feeding the first filament and the second filament. For example, one motor may feed the first filament and another motor may feed the second filament. Each of the motors may be independently controlled by the controller 110. Selective, or independent, control of the feeds may allow for the same or different feed forces to be applied to each of the filaments 114.

The filaments 114 may be made of any suitable material, such as polyethylene, PEBAX elastomer (commercially available from Arkema S.A. of Colombes, France), nylon 12, polyurethane, polyester, liquid silicone rubber (LSR), or PTFE.

The filaments 114 may have any suitable Shore durometer. In some embodiments, the filaments 114 may have, or define, a Shore durometer suitable for use in a catheter. In some embodiments, the filaments 114 have a Shore durometer of at least 25A and up to 90A. In some embodiments, the filaments 114 have a Shore durometer of at least 25D and up to 80D.

In some embodiments, the filament handling system 106 may provide a soft filament as one of the filaments 114. In some embodiments, a soft filament may have a Shore durometer less than or equal to 90A, 80A, 70A, 80D, 72D, 70D, 60D, 50D, 40D, or 35D.

In some embodiments, the filament handling system 106 may provide a hard filament and a soft filament having a Shore durometer less than the soft filament. In some embodiments, the soft filament has a Shore durometer that is 10D, 20D, 30D, 35D, or 40D less than a Shore durometer of the hard filament.

The system 100 may be configured to provide a jacket 118 between the Shore durometers of a hard filament and a soft filament. In some embodiments, the filament handling system 106 may provide a hard filament having a Shore durometer equal to 72D and a soft filament having a Shore durometer equal to 35D. The system 100 may be capable of providing a jacket 118 having a Shore durometer that is equal to or greater than 35D and less than or equal to 72D.

The system 100 may be configured to provide a jacket 118 having, or defining, segments with different Shore durometers. In some embodiments, the system 100 may be capable of providing a jacket 118 having one or more of a 35D segment, a 40D segment, 55D segment, and a 72D segment.

The filaments 114 may have any suitable width or diameter. In some embodiments, the filaments 114 have a width or diameter of 1.75 mm. In some embodiments, the filaments 114 have a width or diameter of less than or equal to 1.75, 1.5, 1.25, 1, 0.75, or 0.5 mm.

Segments may have uniform or non-uniform Shore durometers. The system 100 may be configured to provide jacket 118 having one or more segments with non-uniform Shore durometers. In some embodiments, the jacket 118 may include continuous transitions between at least two different Shore durometers.

The controller 110 may be configured to change a feeding force applied to one or more of the filaments 114 to change a ratio of material in the jacket over a longitudinal distance. By varying the feeding force, the system 100 may provide different Shore durometer segments in a jacket 118, whether uniform or non-uniform. In one example, sharp transitions between uniform segments may be provided by stopping or slowing longitudinal movement while continuously, or discretely with a large step, changing the feeding force of one filament relative to another filament of the substrate 116 relative to the heating cartridge 102. In another example, gradual transitions between segments may be provided by continuously, or discretely with small steps, changing the feeding force of one filament relative to another filament while longitudinally moving the substrate 116 relative to the heating cartridge 102.

The system 100 may be configured to provide a jacket 118 having varying thicknesses. In some embodiments, the controller 110 may be configured to vary one or more parameters, for example, at least one of: a longitudinal speed of the substrate 116 relative to the heating cartridge 102, a feeding force applied to one or more filaments 114, and an amount of heat provided by the heating element 104. Varying one or more of these parameters during formation of the jacket 118 may be used to change a thickness of the jacket over a longitudinal distance. In some embodiments, the controller 110 may be configured to vary one or more of these parameters in conjunction with using a particular heating cartridge.

The one or more wires 115 provided by the wire handling system 107 may be introduced in any suitable manner. In some embodiments, the wires 115 may be attached to the substrate 116 and pulled by movement of the substrate. One example of a wire is a pull wire that may be used to steer the catheter produced by the system 100. In some embodiments, a particularly shaped heating cartridge may be used to accommodate one or more wires 115.

Any suitable type of heating element 104 may be used. In some embodiments, the heating element 104 may be a resistive-type heating element, which may provide heat in response to an electrical current. Other types of heating elements that may be used for the heating element 104 include a radio frequency (RF) or ultrasonic-type heating element. The heating element 104 may be capable of providing heat sufficient to melt the filaments 114. In some embodiments, the heating element 104 may heat the filaments 114 to greater than or equal to 235, 240, 250, or 260 degrees Celsius. In general, the one or more heating elements 104 may be used to heat the filaments 114 to any suitable melting temperature known to one of ordinary skill in the art having the benefit of this disclosure.

Any suitable user interface 112 may be used to communicate with the controller 110. Non-limiting examples of user interfaces 112 include one or more of a stationary or portable computer, a monitor or other display, a touchscreen, a keyboard, a mouse, a tablet, a phone, a knob, a switch, a button, and the like. In some embodiments, the user interface 112 may allow the user to input direct commands to or to enter code to program operations of the controller 110. For example, in one or more embodiments, a program may include various command lines (e.g., for printing various jacket segments) as described in U.S. patent application Ser. No. 17/081,815, entitled "ADDITIVE MANUFACTURING FOR MEDCIAL DEVICES," which is herein incorporated by reference in its entirety.

Figure 2:
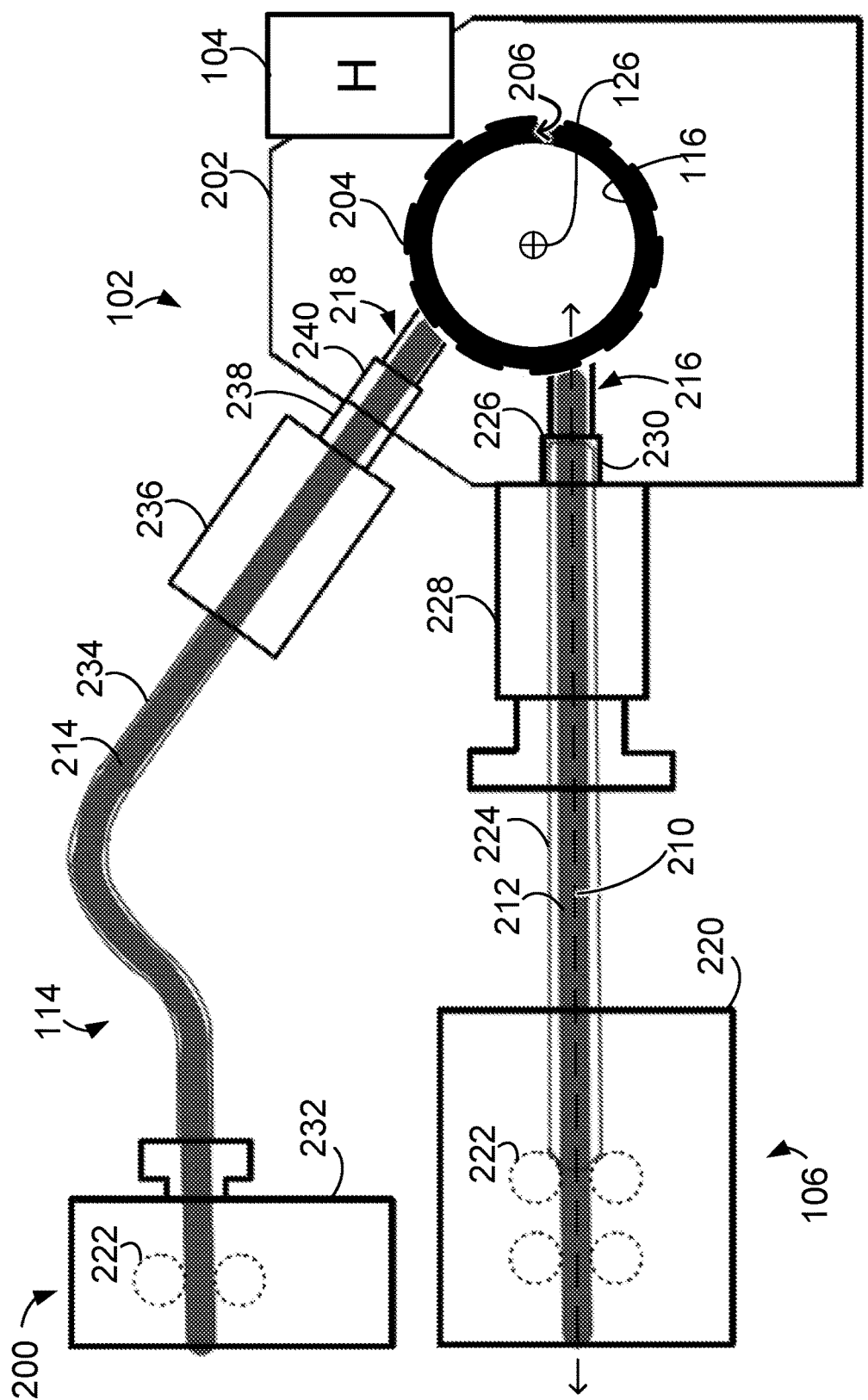
FIG. 2 is a conceptual diagram that illustrates one example of an additive manufacturing apparatus for use with, for example, the additive manufacturing system of FIG. 1.

FIG. 2 shows one example of an additive manufacturing apparatus 200 of the additive manufacturing system 100 in an end view along the longitudinal axis 126, which is illustrated as a circle and cross. More detail of some components of the additive manufacturing system 100 are shown, such as the heating cartridge 102 and the filament handling system 106.

The heating cartridge 102 may include a heating block 202 at least partially defining an interior volume 204. The interior volume 204 may be heated by the heating element 104. The heating element 104 may be thermally coupled to the heating block 202 to melt filament material in the interior volume 204. In general, the system 100 may be configured to melt any portion of the filaments 114 in the interior volume 204. The heating element 104 may be disposed in an exposed or exterior volume defined in the heating block 202. The heating element 104 may be positioned proximate to or adjacent to the interior volume 204. In some embodiments, one, two, three, or more heating elements 104 may be thermally coupled to the heating block 202.

The heating block 202 may allow the substrate 116, which may be an elongate substrate or member, to pass through the heating block. The substrate 116 may be able to extend, or pass, through the interior volume 204. The substrate channel 206 defined by the heating cartridge 102 may extend through the interior volume 204. The substrate channel 206 may extend in a same or similar direction as the substrate 116. The substrate channel 206 may extend along the longitudinal axis 126.

A width or diameter of the interior volume 204 is larger than a width or diameter of the substrate 116. The width or diameter of the interior volume 204 or the substrate 116 is defined in a lateral direction, which may be orthogonal to the longitudinal axis 126. In one example, the lateral direction may be defined along a lateral axis 210. In some embodiments, the clearance between the substrate 116 and interior volume 204 is relatively small to facilitate changes in composition of filament material used to form the jacket 118 (FIG. 1) around the substrate 116.

The portion of the interior volume 204 around the substrate 116 may receive a flow of melted filament material from the filaments 114. When more than one filament material is provided to the interior volume 204, the filament materials may flow and blend, or mix, around the substrate 116.

In the illustrated embodiment, the filaments 114 includes a first filament 212 and a second filament 214. The first filament 212 may be provided into the interior volume 204 through a first filament port 216 at least partially defined by the heating block 202. The second filament 214 may be provided into the interior volume 204 through a second filament port 218 at least partially defined by the heating block 202. Each filament port 216, 218 may be at least partially defined by the heating block 202. Each filament port 216, 218 may be in fluid communication with the interior volume 204.

The filaments 114 may be delivered to the interior volume 204 in the same or different manners. In the illustrated embodiment, the first filament 212 is delivered to the interior volume 204 in a different manner than the second filament 214.

The filament handling system 106 may include a first handling subassembly 220. The first handling subassembly 220 may deliver the first filament 212 to the interior volume 204. The first handling subassembly 220 may include one or more pinch rollers 222. Each of the one or more pinch rollers 222 may be operably coupled to a motor. Any suitable number of pinch rollers 222 may be used. As illustrated, the first handling subassembly 220 may include two sets of pinch rollers 222. Pinch rollers 222 may be used to apply a motive force to the first filament 212 to move the first filament, for example, toward the interior volume 204.

The heating cartridge 102 may include a first guide sheath 224. The first guide sheath 224 may extend between the filament handling system 106 and the interior volume 204. The first guide sheath 224 may be coupled to the heating block 202. The first guide sheath 224 may extend into the first filament port 216 from an exterior of the heating block 202. The first guide sheath 224 may define a lumen in fluid communication with the interior volume 204. An inner width or diameter of the lumen may be defined to be greater than a width or diameter of the first filament 212. The first filament 212 may extend through the first guide sheath 224 from the pinch rollers 222 of the first handling subassembly 220 to the first filament port 216 and extend distally past the first guide sheath 224 into the interior volume 204.

As used herein with respect to the filaments 114, the term "distal" refers to a direction closer to the interior volume 204 and the term "proximal" refers to a direction closer to the filament handling system 106.

In some embodiments, a proximal end of the first guide sheath 224 may terminate proximate to one of the pinch rollers 222. A distal end of the first guide sheath 224 may terminate at a shoulder 226 defined by the first filament port 216. A distal portion or distal end of the first guide sheath 224 may be positioned proximate to or adjacent to the interior volume 204.

The inner width or diameter of the lumen of the first guide sheath 224 may be defined to be substantially the same or equal to an inner width or diameter of the first filament port 216, such as a smallest inner width or diameter of the first filament port. In other words, an inner surface of the first guide sheath 224 may be flush with an inner surface of the first filament port 216.

In some embodiments, the heating cartridge 102 may include a support element 228. The support element 228 may be coupled to the first guide sheath 224. The first guide sheath 224 may extend through a lumen defined by the support element 228. The support element 228 may be proximate to the heating block 202. In the illustrated embodiment, the support element 228 is coupled to the heating block 202. The support element 228 may include a coupling protrusion configured to be mechanically coupled to a coupling receptacle 230 defined by the first filament port 216. In some embodiments, the coupling receptacle 230 may define threads and the coupling protrusion of the support element 228 may define complementary threads.

The coupling receptacle 230 may terminate at the shoulder 226 of the first filament port 216. The coupling protrusion of the support element 228 may be designed to terminate at the shoulder 226. In some embodiments, a distal end of the support element 228 and the distal end of the first guide sheath 224 may engage the shoulder 226. In other embodiments, the distal end of the support element 228 may engage the shoulder 226 and the distal end of the first guide sheath 224 may engage a second shoulder (not shown) defined by the first filament port 216 distal to the shoulder 226.

When the first filament port 216 defines one shoulder, the first filament port 216 may define at least two different inner widths or diameters. The larger inner width or diameter may be sized to thread the support element 228 and the smaller inner width or diameter may be sized to match the inner width or diameter of the first guide sheath 224.

When the second filament port 218 defines two shoulders, the first filament port 216 may define at least three different inner widths or diameters. The largest inner width or diameter may be sized to thread the support element 228. The intermediate inner width or diameter may be sized to receive a distal portion of the first guide sheath 224. The smallest inner width or diameter may be sized to match the inner width or diameter of the first guide sheath 224.

The filament handling system 106 may include a second handling subassembly 232. The second handling subassembly 232 may deliver the second filament 214 to the interior volume 204. The second handling subassembly 232 may include one or more pinch rollers 222. Each of the one or more pinch rollers 222 may be operably coupled to a motor. Any suitable number of pinch rollers 222 may be used. As illustrated, the second handling subassembly 232 may include one set of pinch rollers 222. Pinch rollers 222 may be used to apply a motive force to the second filament 214.

The heating cartridge 102 may include one or more of a second guide sheath 234, a heat sink 236, and a heat break 238. The second guide sheath 234 may extend at least between the second handling subassembly 232 and the heat sink 236. The second guide sheath 234 may be coupled to the heat sink. The second guide sheath 234 may be coupled to the second handling subassembly 232. The heat sink 236 may be coupled to the heat break 238. The heat break 238 may be coupled to the heat block 202. The heat break 238 may extend into the second filament port 218 from an exterior of the heating block 202.

The second guide sheath 234 may define a lumen in fluid communication with the interior volume 204. The second filament 214 may extend through the second guide sheath 234 from the second handling subassembly 232 to the heat sink 236, through the heat sink 236, through the heat break, and through the second filament port 218. In some embodiments, the second guide sheath 234 may extend to the pinch rollers 22 in the second handling subassembly 232. In some embodiments, the second guide sheath 234 may extend at least partially into the heat sink 236.

The heat break 238 may be proximate to the heating block 202. The heat break 238 may be positioned between the heat sink 236 and the heating block 202. The heat break 238 may include a coupling protrusion configured to mechanically couple to a coupling receptacle 240 defined by the second filament port 218. In some embodiments, the coupling receptacle 240 may define threads and the coupling protrusion of the heat break 238 may define complementary threads. The second filament port 218 may include one or more shoulders such as those described with respect to the first filament port 216, except that the second filament port 218 may not be configured to receive the second guide sheath 234. The inner width or diameter of the support element 228 may be larger than the inner width or diameter of the heat break 238, for example, to accommodate the outer width or diameter of the first guide sheath 224. In other embodiments, the second filament port 218 may be configured to receive the second guide sheath 234 in a similar manner to the first filament port 216 receiving the first guide sheath 224.

Any suitable material may be used to make the guide sheaths 224, 234. In some embodiments, one or both guide sheaths 224, 234 may include a synthetic fluoropolymer. One or both guide sheaths 224, 234 may include polytetrafluoroethylene (PTFE). Another suitable material may include an ultra-high molecular weight polyethylene (UHMWPE).

Any suitable material may be used to make the support element 228. In some embodiments, the support element 228 may be a thermal insulator. The support element 228 may include a thermoplastic. The support element 228 may be made of a polyamide-imide, such as a TORLON polyamide-imide (commercially available from McMaster-Carr Supply Co. of Elmhurst, Illinois). Other suitable materials may include liquid-crystal polymer, polyaryletherketone (PAEK), polyphenylene sulfide, and polysulfone.

The support element 228 may provide mechanical support to the first guide sheath 224. The support element 228 may include a substantially rigid material. In some embodiments, the support element 228 include a material having a higher durometer than material used to make the first guide sheath 224.

Any suitable material may be used to make the heat sink 236. The heat sink 236 may include a high thermal conductivity material. In some embodiments, the heat sink 236 includes aluminum.

Any suitable material may be used to make the heat break 238. The heat break 238 may include a low thermal conductivity material. In some embodiments, the heat break 238 includes titanium. The heat break 238 may include a necked portion to reduce the amount of material between a proximal portion and a distal portion of the heat break. The necked portion may facilitate a reduced thermal conductivity between the proximal portion and the distal portion of the heat break 238.

In general, use of the apparatus 200 may facilitate using softer filaments at high feed forces and pressures, which tend to compress the soft filament and may result in jamming. Using higher feed forces and pressures may allow for a greater range of process conditions and may provide a consistent jacket around the substrate. In particular, use of the first guide sheath 224 extending at least partially into the first filament port 216 may facilitate the use of softer filament and greater "push-ability." Additionally, or alternatively, the use of the support element 228 may also facilitate the use of softer filament and greater "push-ability."

Figure 5:
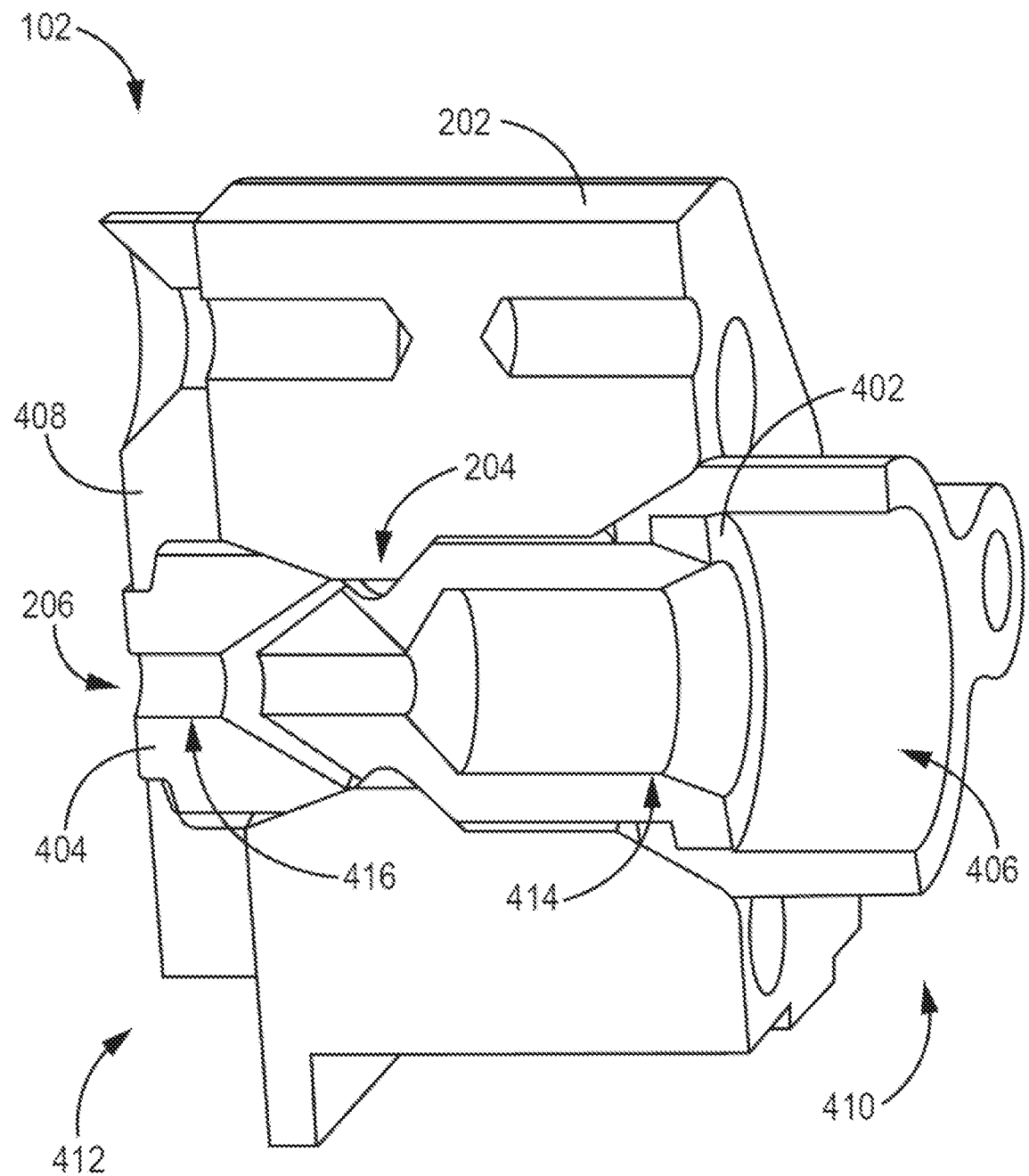
FIG. 5 is a conceptual diagram that illustrates one example of a heating cartridge for use with, for example, the additive manufacturing system of FIG. 1.

FIG. 5 shows a partial cross-sectional side view of one example of the heating cartridge 102. The heating cartridge 102 or the heating block 202 may extend from a proximal side 410 to a distal side 412. In some embodiments, the heating cartridge 102 may include one or more of the heating block 202, an inlet die 402 coupled to the proximal side 410 of the heating block, an outlet die 404 coupled to the distal side 412 of the heating block, a proximal retaining plate 406 to facilitate retaining the inlet die adjacent to the heating block, and a distal retaining plate 408 to facilitate retaining the outlet die adjacent to the heating block.

The inlet die 402 and the outlet die 404 may be retained in any suitable manner. In the illustrated embodiment, the outlet die 404 may be retained by a distal shoulder of the distal retaining plate 408. In some embodiments, the inlet die 402 may be retained by the proximal retaining plate 406 between a distal shoulder of the proximal retaining plate 406 and a fastener, such as a nut with a lumen extending through, which may be threaded to the retaining plate to engage a proximal surface of the inlet die. The retaining plates 406, 408 may be fastened to the heating block 202 in any suitable manner.

The inlet die 402 may at least partially define a substrate inlet port 414. The outlet die 404 may at least partially define a substrate outlet port 416.

The inlet die 402 may at least partially define the interior volume 204. The outlet die 404 may at least partially define the interior volume 204. In some embodiments, an exterior surface of the inlet die 402, an interior surface of the outlet die 404, and an interior surface of the heating block 202 may cooperatively define the interior volume 204.

The substrate channel 206 may be described as extending from the proximal side 410 to the distal side 412 of the heating cartridge 102, or vice versa. The substrate channel 206 may extend through the interior volume 204. As shown, the substrate channel 206 may extend through one or more of the proximal retaining plate 406, the inlet die 402, the heating block 202, the outlet die 404, and the distal retaining plate 408.

Figure 6:
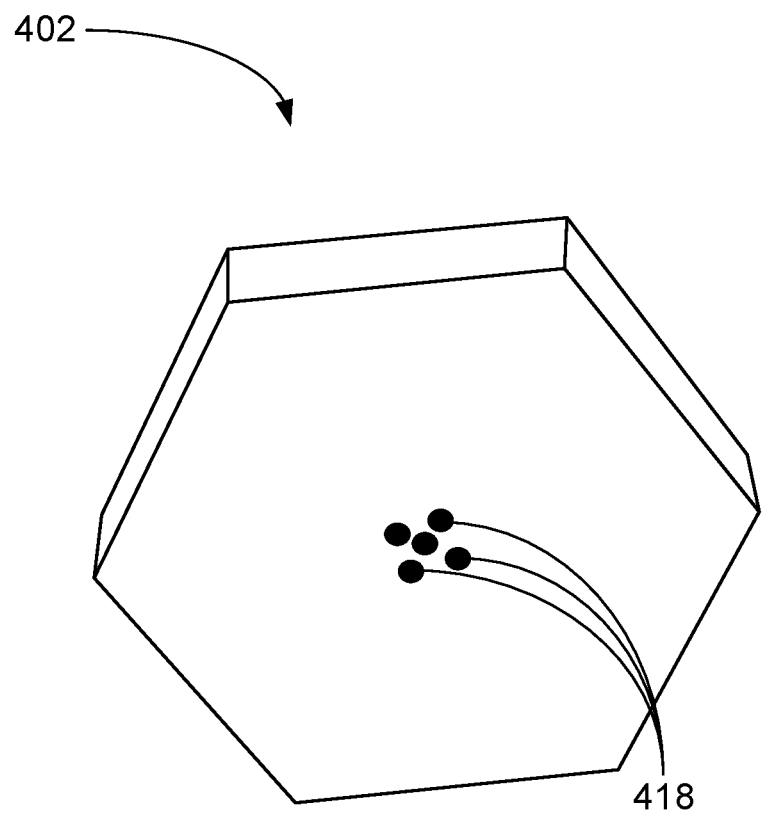
FIG. 6 is a conceptual diagram that illustrates one example of an inlet die of a heating cartridge for use with, for example, the additive manufacturing system of FIG. 1.

FIG. 6 illustrates an end view of one example of an inlet die 402 that may be used in the heating cartridge 102. The inlet die 402 may include a plurality of openings 418 to receive the substrates 116. In other words, the substrates 116 may extend through the inlet die 402 to position the substrates and maintain spatial orientation of the plurality of substrates 116. Therefore, the substrates 116 may be properly positioned within the interior volume 204 for filament material to be printed thereon. The openings 418 of the inlet die 402 may match any suitable the number of substrates 116. As shown in FIG. 6, the inlet die 402 defines five openings 418. Further, the openings 418 of the inlet die 402 may match the openings 149 of the sleeve 142 such that, e.g., the substrates 116 may pass through and extend therebetween.

Figure 7:
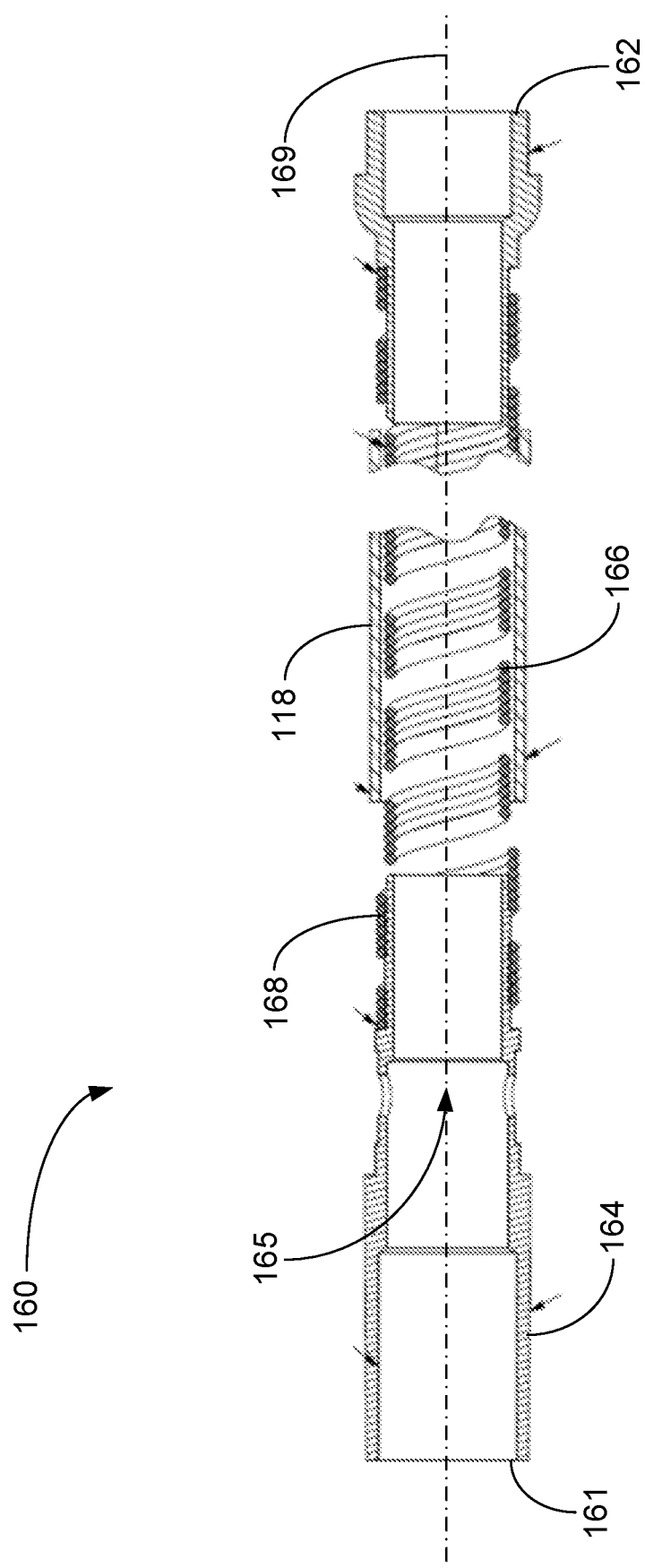
FIG. 7 is a cross-sectional view of an illustrative subassembly for use with, for example, the additive manufacturing system of FIG. 1.

FIG. 7 illustrates a subassembly 160 configured to be positioned over the substrate 116 (e.g., not shown in FIG. 7) and printed thereupon by the additive manufacturing system 100 described herein. In one or more embodiments, the subassembly 160 may be positioned on the substrate 116 with an insulation layer or liner therebetween. The subassembly 160 may include a variety of different components that can be embedded in the medical device by printing a jacket 118 (e.g., a catheter jacket or outer insulation) over the subassembly 160. For example, the subassembly 160 may include electrical components or circuits, braided or coiled shafts, polytetrafluoroethylene (PTFE), fluoroethylene propylene (FEP), polymer tubing, pull-wire assemblies, polyurethane, carbothane, sensors, inner lumens, etc. Specifically, in one or more embodiments, electrical components of the subassembly 160 (e.g., for a lead body) may include electrode rings, coils, wires, cables, sensors, electromagnetic coils and/or cables, fiber optic cables, circuits, insulation layers, adhesives, joints between components, etc.

As shown in FIG. 7, the subassembly 160 may extend between a first end 161 and a second end 162 along a longitudinal axis 169. Further, the subassembly 160 may define a passageway 165 extending between the first and second ends 161, 162 and configured to receive the substrate 116 (not shown in FIG. 7). In other words, the subassembly 160 may be positioned on and encircle the substrate 116. The subassembly 160 may then be printed over the subassembly 160 to encapsulate or cover at least a portion of the subassembly 160. In one or more embodiments, the medical device may include multiple subassemblies 160 contained therein and, e.g., encapsulated by the printed jacket 118.

The subassembly 160 may include an electrode ring 164 proximate the first end 161 of the subassembly 160. When the system 100 prints over the substrate 116 and subassembly 160 to create the medical device, the electrode ring 164 may be left exposed. For example, in one or more embodiments, the system 100 may selectively print along the subassembly 160 such that the jacket 118 is not printed over the electrode ring 164 (e.g., to leave the electrode ring 164 exposed). In one or more embodiments, a mask (e.g., an etchable mask) may be deposited over the electrode ring 164 such that after the jacket 118 is printed over the subassembly 160, the portion of the printed jacket 118 positioned over the electrode ring 164 may be removed or etched away (e.g., to leave the electrode ring 164 exposed). The electrode ring 164 may be left exposed such that the medical device may deliver therapy at the location at which the electrode ring 164 is positioned. Further, the subassembly 160 may include any number of electrode rings 164. Further yet, the electrode rings 164 may be positioned at any suitable location along the subassembly 160.

The subassembly 160 may also include one or more coils to transmit an electrical signal through the device and the subassembly 160. For example, as shown in FIG. 7, the subassembly may include an inner coil 166 and an outer coil 168. Additionally, in some embodiments, the subassembly 160 may include insulation, cables, wires, pull-wires, sensors, lumens (e.g., open lumens for fluid transfer or shaping members), adhesives, etc. Further, as shown in FIG. 7, at least a portion of the printed jacket 118 is positioned over the inner coils 166.

Figure 8:
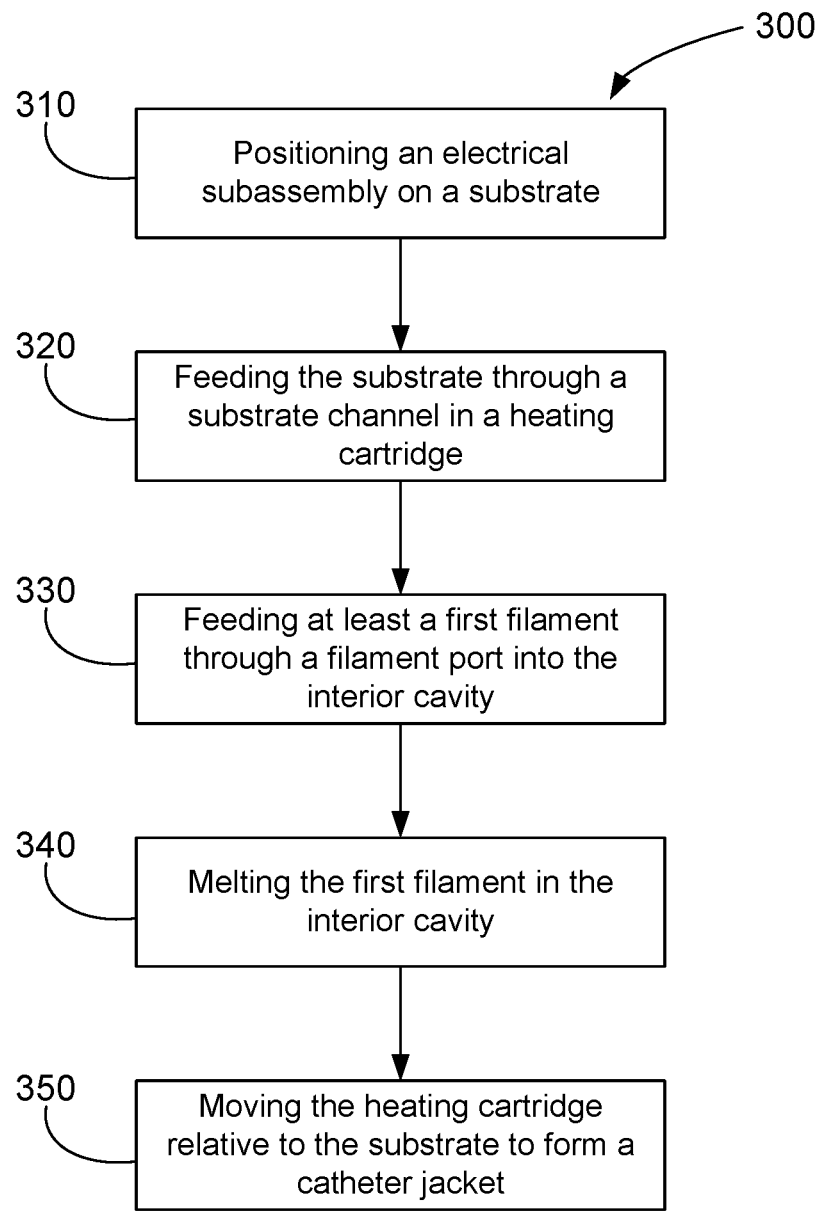
FIG. 8 is a flow diagram that illustrates one example of a method for use with, for example, the additive manufacturing system of FIG. 1.

FIG. 8 shows one example of a method 300 of using the system for additive manufacturing to print a jacket over a substrate and an electrical subassembly positioned thereon. The method may include positioning 310 an electrical subassembly on a substrate.

Figure 9A:
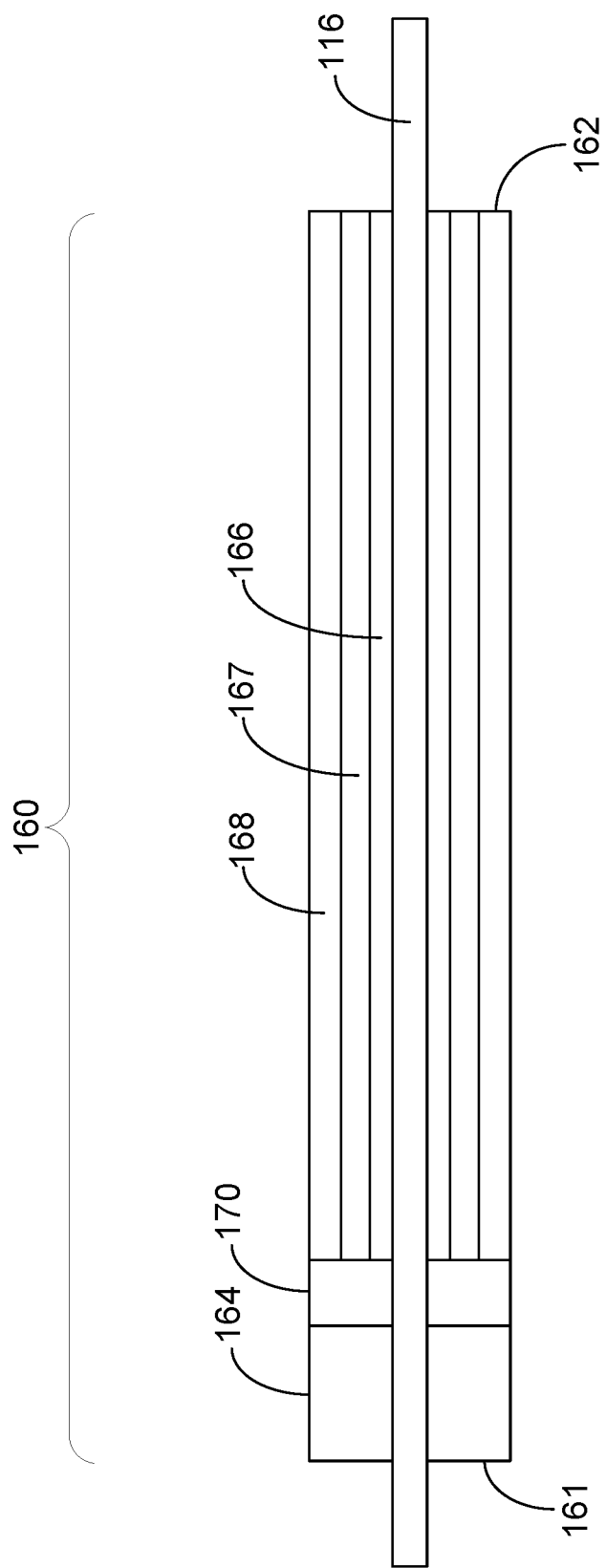
FIG. 9A is a conceptual diagram that illustrates a subassembly positioned on a substrate for use with, for example, the additive manufacturing system of FIG. 1.

For example, FIG. 9A illustrates a conceptual diagram of a subassembly 160 positioned on a substrate 116 (e.g., a conceptual cross-section of a tubular subassembly 160 and substrate 116). The subassembly 160 may define a preformed body upon which various components are located. The body of the subassembly 160 may include (e.g., be formed of) metals and alloys, thermoplastics (such as polyurethane, silicone, carbothane, conductors, insulators, electrodes, etc. The subassembly 160 may include an electrode ring 164 proximate a first end 161 of the subassembly 160. The subassembly 160 may also include an inner coil 166, an outer coil 168, and insulation 167 therebetween. The insulation 167 may electrically separate and isolate the inner and outer coils 166, 168 from one another. For example, the insulation 167 may include (e.g., be formed of) polytetrafluoroethylene (PTFE), ethylene tetrafluoroethylene copolymer (ETFE), silicone, polyurethane, adhesive layers, polymer tubing, or other non-conductive materials. One or both of the inner and outer coils 166, 168 may be operably connected to the electrode ring 164 or other electrode rings of the subassembly 160. It is noted that, while only one electrode ring 164 is shown in FIG. 9A, the subassembly 160 may include any suitable number of electrode rings. Further, the inner and outer coils 166, 168 may be operably connected to other components of the medical device (e.g., a lead extending through the printed jacket) to provide a connection between an electrical source and the electrode rings 164.

The subassembly 160 may also include a bonding zone 170 located adjacent to the electrode ring 164. The bonding zone 170 may be located along the subassembly 160 between the electrode ring 164 and the inner/outer coils 166, 168 (e.g., along the longitudinal axis 169). The jacket may be printed to cover at least a portion of the bonding zone 170 and extend over the inner and outer coils 166, 168. Further, the jacket may be printed on the bonding zone 170 (and away from the electrode ring 164) such that the printed jacket may be spaced apart from the electrode ring 164. The bonding zone 170 may include (e.g., be formed of) platinum-iridium alloy, titanium, MP35N, stainless steel, copper, welds, chemical joints (e.g., such as adhesive joints, thermal joints, etc.), mechanical interlock, etc.

Figure 9B:
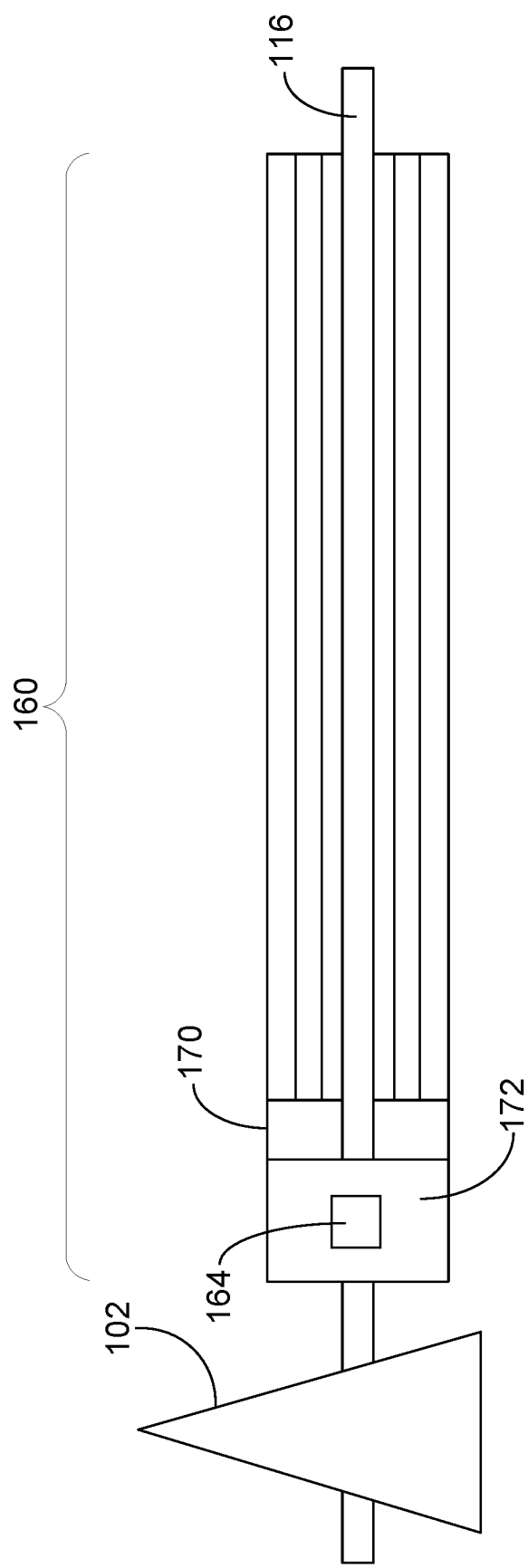
FIG. 9B is a conceptual diagram of the subassembly and substrate of FIG. 9A positioned relative to a heating cartridge.

The method 300 of FIG. 8 may also include feeding 320 the substrate through a substrate channel in a heating cartridge. The substrate channel may be in fluid communication with an interior cavity of the heating cartridge. For example, as shown in FIG. 9B, the substrate 116 and the subassembly 160 positioned thereon may be located proximate the heating cartridge 102 to be passed therethrough. In one or more embodiments, the subassembly 160 may include a mask 172 surrounding the electrode ring 164 (e.g., as shown in FIG. 9B). The mask 172 may be positioned over the electrode ring 164 to protect the electrode ring 164 during the printing process (e.g., prevent material from being directly printed on the electrode ring 164). Further, the mask 172 may be removed (e.g., etched) after the printing process to remove anything printed thereon and expose the electrode ring 164 (e.g., to be used as a contact point for the resulting medical device). The mask 172 may include (e.g., be formed of) any suitable material such as, e.g., fluorinated ethylene propylene (FEP), polytetrafluoroethylene (PTFE), other thermoplastics, polyurethane, polyether block amid (PEBA), ethylene tetrafluoroethylene copolymer (ETFE), PET heat shrink, etc. As such, in one or more embodiments, the method 300 of FIG. 8 may also include masking the electrode ring of the electrical subassembly. In other embodiments, the system may selectively print to avoid the electrode ring (e.g., by starting printing on the bonding zone 170 or away from the electrode ring 164).

Additionally, the method 300 may include feeding 330 at least a first filament through a filament port into the interior cavity and melting 340 the first filament in the interior cavity. In one or more embodiments, the method may also include feeding a second filament through another filament port into the interior cavity and melting the second filament with the first filament to form the printed jacket including material from at least the first filament and the second filament. In other words, multiple filaments may be used in combination to achieve various different properties and characteristics of the resulting printed jacket, as described herein. For example, in one or more embodiments, the method may also include adjusting a ratio of the first filament relative to the second filament over a longitudinal distance (e.g., of the printed jacket) to change the hardness (e.g., Shore durometer) of the printed jacket over the longitudinal distance of the printed jacket.

Figure 9C:
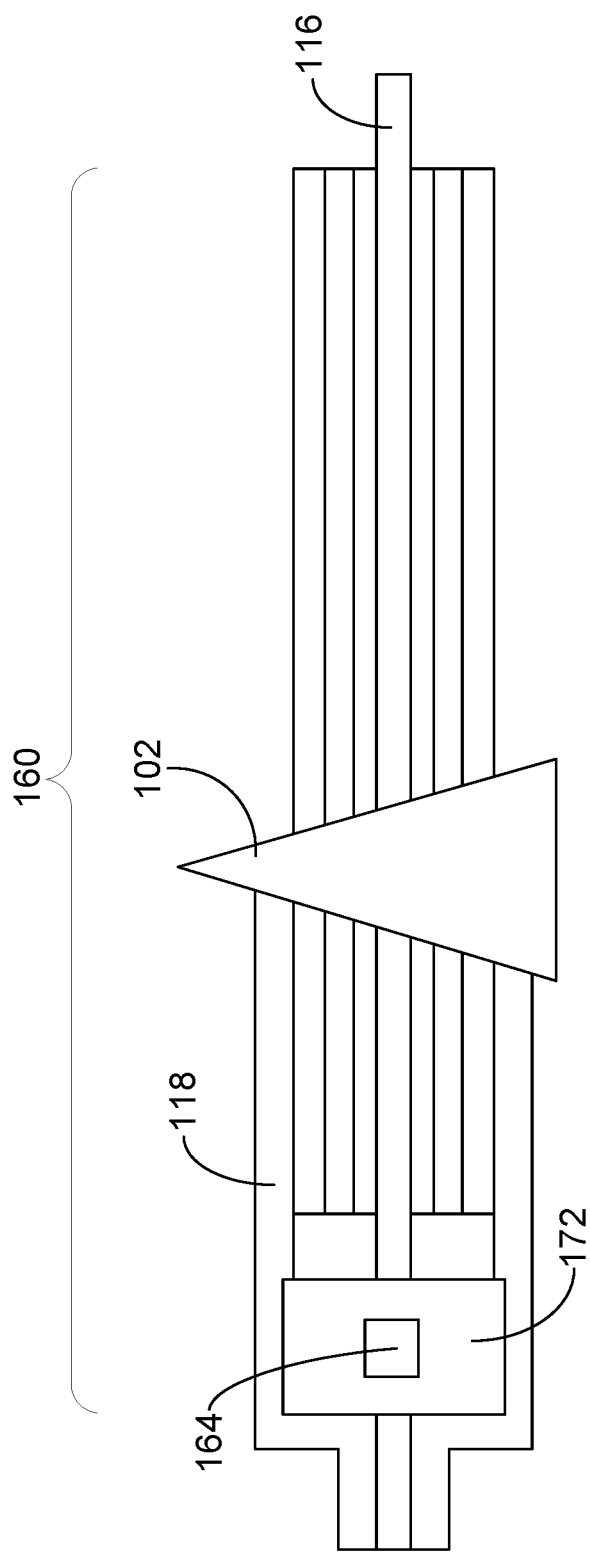
FIG. 9C is a conceptual diagram of the subassembly and substrate of FIG. 9B passing through the heating cartridge to print a jacket thereon.

The method 300 of FIG. 8 may also include moving 350 the heating cartridge relative to the substrate at least in a longitudinal direction to form a printed jacket including material from at least the first filament. For example, as shown in FIG. 9C, the subassembly 160 and substrate 116 may pass through the heating cartridge 102 to print a material over the subassembly 160 and substrate 116 to form a printed jacket 118. The printed jacket 118 may cover at least a portion of the (electrical) subassembly 160 and the substrate 116 to help create the medical device. Specifically, as shown in FIG. 9C, the jacket 118 may be printed over a mask 172 covering the electrode ring 164. Also, in one or more embodiments, the heating cartridge 102 or substrate 116 may also be rotated relative to one another while moving along the longitudinal directional.

Figure 9D:
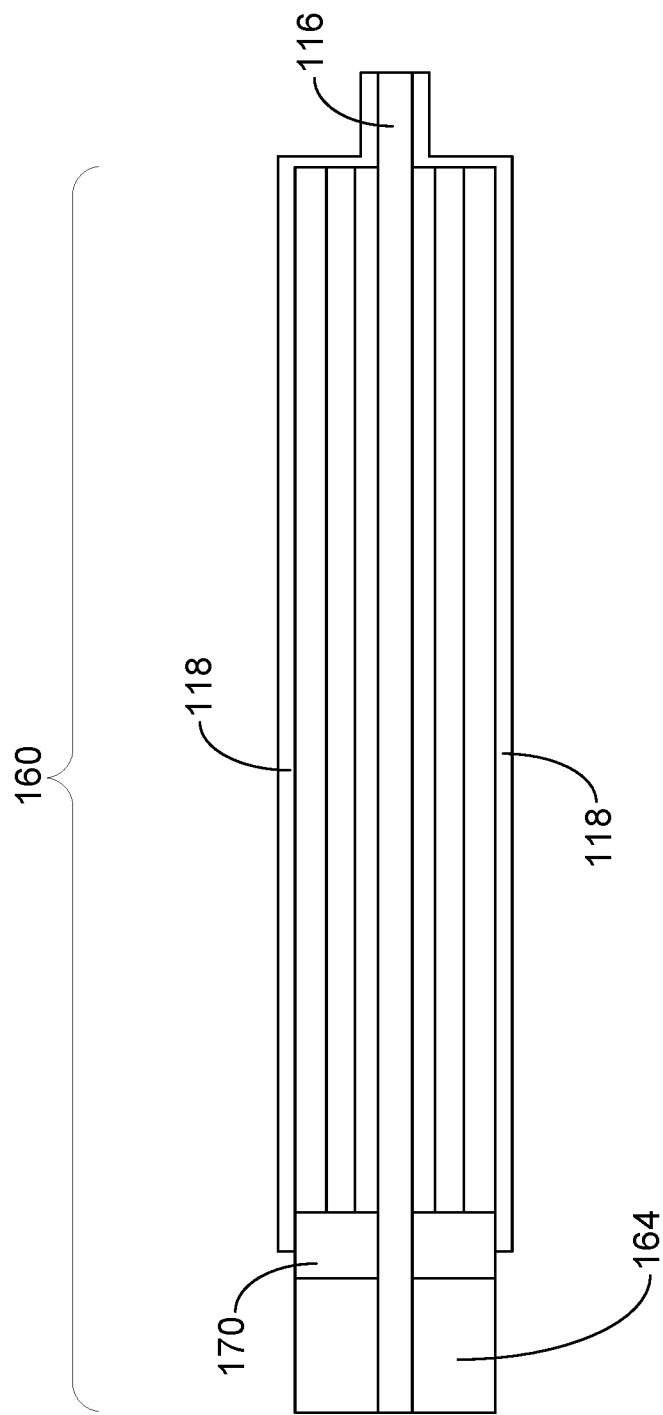
FIG. 9D is a conceptual diagram of the subassembly and substrate of FIG. 9C with the jacket disposed thereon and an electrode ring exposed.

Further, as shown in FIG. 9D, the mask 172 may be removed or etched to remove the printed jacket 118 from the electrode ring 164. Thereafter, the electrode ring 164 may be exposed and the printed jacket 118 may be spaced apart from and/or not covering the electrode ring 164. As such, in one or more embodiments, the method 300 of FIG. 8 may also include removing the mask to expose the electrode ring after the printedjacket is formed (e.g., over the mask). Also, in some embodiments, the jacket 118 may be printed on the subassembly 160 (e.g., without a mask) such that no material is printed on the electrode ring 164 (e.g., starting printing on the bonding zone 170) and the printed jacket 118 is spaced apart from the electrode ring 164.

After printing the jacket 118 on the substrate 116 and the subassembly 160, the substrate 116 may be removed from the printed jacket 118 to define a lumen extending through the printed jacket 118. In one or more embodiments, an electrical lead may be inserted into the lumen to form the medical device. In one or more embodiments, the substrate 116 being printed on may already be an electrical lead (e.g., such that the substrate 116 may not need to be removed and replaced after printing). In other embodiments, the substrate may be replaced with (e.g., within the lumen), e.g., a guidewire, stylet, shaping member, radiopacifying member, fluid, a pull wire, coil, cable, malleable metal or plastic, a sensor (e.g., a fiberoptic cable), thermocouple assembly, etc.

FIG. 10 illustrates one example of a jacket 118 printed on a substrate 116 that may be manufactured using the system 100 as described herein. The substrate 116 may include a liner 180 (e.g., a harvestable liner) positioned over the substrate 116. The liner 180 may extend around the circumference of the substrate 116. The substrate 116 may be configured to move relative to the liner 180. In other words, the substrate 116 may be flexible within the liner 180 even after the jacket 118 is printed over the liner 180. The liner 180 may include (e.g., be formed of) polytetrafluoroethylene (PTFE), high-density polyethylene (HDPE), polyvinylidene fluoride (PVDF), ethylene tetrafluoroethylene copolymer (ETFE), etc.

The liner 180 may be positioned on the substrate 116 in any suitable way. For example, in one or more embodiments, the liner 180 may be a substance that is deposited on an outer surface of the substrate 116. In other embodiments, the liner 180 may be a sheath that is slid over the substrate 116.

The system 100 may be used to print a jacket 118 on the liner 180. The filament material melted within the heat cartridge may bond with the liner 180 to form the printed jacket 118. After the printed jacket 118 is formed on the liner 180, the substrate 116 may still move and be flexible within the liner 180. Therefore, in one or more embodiments, the substrate 116 may be removed from the printed jacket 118 and a lead, dilator, guidewire, stylet, needle, sensor, conductor, surgical tool, etc. may be inserted therein. Furthermore, in one or more embodiments, the substrate 116 may be an electrical lead. In other words, the jacket 118 may be printed directly on the liner 180 that surrounds the electrical lead. Because the electrical lead maintains movability and flexibility relative to the liner 180 after printing the jacket (e.g., instead of adhering to and limiting movement of the electrical lead), the electrical lead may be used in place of the substrate 116.

Figure 11:
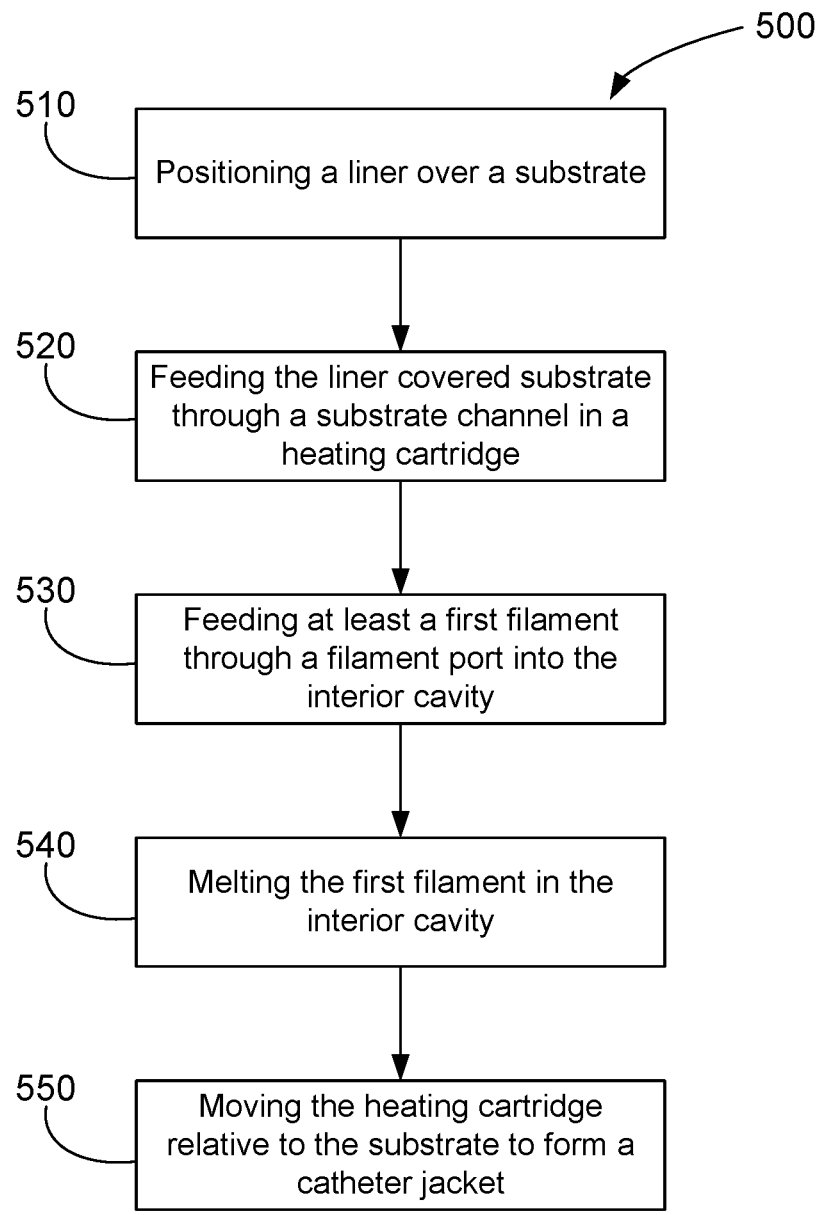
FIG. 11 is a flow diagram that illustrates one example of a method of manufacturing the catheter of FIG. 10 using, for example, the additive manufacturing system of FIG. 1.

A method 500 of using the system to print a jacket on a liner covered substrate is shown in FIG. 11. For example, the method 500 may include positioning 510 a liner over a substrate and feeding 520 the liner covered substrate through a substrate channel in a heating cartridge. The substrate channel may be in fluid communication with an interior cavity of the heating cartridge. The method 500 may also include feeding 530 at least a first filament through a filament port into the interior cavity and melting 540 the first filament in the interior cavity. Further, the method 500 may also include moving 550 the heating cartridge relative to the substrate at least in a longitudinal direction to form a printed jacket including material from at least the first filament. The substrate may be configured to move relative to the liner after the printed jacket is formed.

In one or more embodiments, the method may include removing the substrate from the formed printed jacket (e.g., to insert an electrical lead therein).

In one or more embodiments, the method may include feeding a second filament through another filament port into the interior cavity and melting the second filament with the first filament to form the printed jacket including material from at least the first filament and the second filament. Also, in one or more embodiment, the method may include adjusting a ratio of the first filament relative to the second filament over a longitudinal distance to change the hardness (e.g., Shore durometer) of the printed jacket over the longitudinal distance.

Illustrative Embodiments

While the present disclosure is not so limited, an appreciation of various aspects of the disclosure will be gained through a discussion of the specific examples and illustrative embodiments provided below. Various modifications of the examples and illustrative embodiments, as well as additional embodiments of the disclosure, will become apparent herein.

A1. An additive manufacturing system for producing a medical catheter or lead, the system comprising:
  a heating cartridge extending from a proximal side to a distal side and comprising a substrate inlet port at the proximal side and a substrate outlet port at the distal side, the heating cartridge defining an interior volume and a substrate channel extending through the interior volume from the proximal side to the distal side, wherein the heating cartridge defines a first filament port in fluid communication with the interior volume to receive a first filament;
  a heating element thermally coupled to the heating cartridge to heat the interior volume;
  a filament handling system comprising one or more motors to feed at least the first filament through the first filament port into the interior volume;
  a substrate handling system comprising:
    a clamp to secure a distal portion of an elongate substrate, wherein the substrate is positioned to pass through the substrate channel when secured by the clamp, wherein the clamp comprises a sleeve and a collar, and wherein the elongate substrate extends through the sleeve and the collar is configured to compress the sleeve on the elongate substrate, and
    one or more motors to move one or both of the substrate when secured by the clamp and the heating cartridge relative to one another; and
  a controller operably coupled to the heating element, one or more motors of the filament handling system, and one or more motors of the substrate handling system, the controller configured to:
    activate the heating element to melt any portion of the first filament in the interior volume;
    control the one or more motors of the filament handling system to selectively control the feeding of the first filament into the interior volume; and
    control one or more motors of the substrate handling system to move one or both of the substrate and the heating cartridge relative to one another in at least a longitudinal direction to form a printed jacket around the substrate, wherein the printed jacket comprises material from the first filament.

A2. The system according to embodiment A1, wherein the heating cartridge comprises an inlet die, a heating block, and an outlet die, wherein the inlet die defines a plurality of openings configured to receive a plurality of substrates, wherein the inlet die maintains spatial orientation of the plurality of substrates.

A3. The system according to any preceding A embodiment, wherein the collar defines an inner hole to receive the sleeve, and wherein the collar is configured to slide along the sleeve to move at least a portion of the sleeve to compress the sleeve against the substrate and restrict movement of the sleeve relative to the substrate.

A4. The system according to any preceding A embodiment, wherein the sleeve comprises a deformable portion and a rigid portion arranged along a longitudinal axis, wherein the collar is configured to slide onto the deformable portion and move the deformable portion to compress the sleeve onto the substrate such that movement of the substrate relative to the sleeve is restricted.

A5. The system according to any preceding A embodiment, wherein the sleeve defines an increasing taper from an end of the sleeve, wherein the collar defines an inner hole having a fixed diameter, wherein the collar is configured to slide over the sleeve from the end of the sleeve and compress the sleeve as the collar moves further onto the sleeve.

A6. The system according to any preceding A embodiment, wherein the sleeve defines one or more slots such that at least a portion of the sleeve moves to compress on the substrate when the collar is slid over the sleeve.

A7. The system according to any preceding A embodiment, wherein the sleeve defines a plurality of openings to receive a plurality of substrates, wherein the sleeve maintains spatial orientation of the plurality of substrates.

A8. The system according to any preceding A embodiment, wherein the heating cartridge further defines a first filament port in fluid communication with the interior volume to receive the first filament and a second filament port in fluid communication with the interior volume to receive a second filament, wherein the one or more motors of the filament handling system is configured to feed the second filament through the second filament port into the interior volume, wherein the controller is configured to:
  activate the heating element to melt any portion of the second filament in the interior volume, and
  control the one or more motors of the filament handling system to selectively control the feeding of the second filament into the interior volume, wherein the printed jacket comprises material from the second filament.

A9. The system according to embodiment A8, wherein the controller is configured to change a feeding force applied to at least one of the first filament and the second filament to change a ratio of material in the printed jacket over a longitudinal distance.

A10. The system according to any preceding A embodiment, wherein the first filament has a Shore durometer less than or equal to 90A, 80A, 70A, 80D, 72D, 70D, 60D, 50D, 40D, or 35D.

A11. The system according to any preceding A embodiment, wherein the substrate outlet port of the heating cartridge defines an interior shoulder, wherein the controller is configured to vary at least one of: a longitudinal speed of the substrate relative to the heating cartridge, a feeding force applied to the first filament, and an amount of heat provided by the heating element to change a thickness of the printed jacket over a longitudinal distance.

B1. A method for additive manufacturing of a medical catheter or lead, the method comprising:
  positioning an electrical subassembly on a substrate, wherein the electrical subassembly comprises an electrode ring;
  feeding the substrate through a substrate channel in a heating cartridge, the substrate channel in fluid communication with an interior cavity of the heating cartridge;
  feeding at least a first filament through a filament port into the interior cavity;
  melting the first filament in the interior cavity; and
  moving the heating cartridge relative to the substrate at least in a longitudinal direction to form a printed jacket comprising material from at least the first filament, wherein the printed jacket covers at least a portion of the electrical subassembly and is spaced apart from the electrode ring.

B2. The method according to embodiment B1, further comprising:
  masking the electrode ring of the electrical subassembly, wherein the printed jacket covers the masked portion of the electrical subassembly; and
  removing the mask to expose the electrode ring after the printed jacket is formed.

B3. The method according to any preceding B embodiment, wherein the electrical subassembly comprises a bonding zone adjacent the electrode ring, and wherein the printed jacket covers at least a portion of the bonding zone.

B4. The method according to embodiment B3, wherein the bonding zone comprises a suitable metal or alloy (e.g., such as platinum-iridium), MP35N, stainless steel, titanium, copper, etc.

B5. The method according to any preceding B embodiment, wherein the electrical subassembly comprises one or more coils (and insulation, wires, cables, polymer tubing, sensors, etc.).

B6. The method according to any preceding B embodiment, further comprising removing the substrate from the printed jacket.

B7. The method according to any preceding B embodiment, further comprising:
  feeding a second filament through another filament port into the interior cavity; and
  melting the second filament with the first filament to form the printed jacket comprising material from at least the first filament and the second filament.

B8. The method according to embodiment B7, further comprising adjusting a ratio of the first filament relative to the second filament over a longitudinal distance to change the Shore durometer of the printed jacket over a longitudinal distance of the printed jacket.

C1. A method for additive manufacturing of a medical catheter or lead, the method comprising:
  positioning a liner over a substrate;
  feeding the liner covered substrate through a substrate channel in a heating cartridge, the substrate channel in fluid communication with an interior cavity of the heating cartridge;
  feeding at least a first filament through a filament port into the interior cavity;
  melting the first filament in the interior cavity; and
  moving the heating cartridge relative to the substrate at least in a longitudinal direction to form a printed jacket comprising material from at least the first filament, wherein the substrate is configured to move relative to the liner after the printed jacket is formed.

C2. The method according to embodiment C1, wherein positioning a liner over a substrate comprises depositing a substance on an outer surface of the substrate.

C3. The method according to any preceding C embodiment, wherein positioning a liner over a substrate comprises sliding a sheath over the substrate.

C4. The method according to any preceding C embodiment, wherein the liner comprises a thin-wall fluoroplastic (e.g., such as polytetrafluoroethylene (PTFE), fluoroethylene propylene (FEP), ethylene tetrafluoroethylene copolymer (ETFE), polyvinylidene fluoride (PVDF), high-density polyethylene (HDPE), etc.

C5. The method according to any preceding C embodiment, further comprising removing the substrate from the printed jacket.

C6. The method according to any preceding C embodiment, wherein the substrate comprises a lead.

C7. The method according to any preceding C embodiment, further comprising:
  feeding a second filament through another filament port into the interior cavity; and
  melting the second filament with the first filament to form the printed jacket comprising material from at least the first filament and the second filament.

C8. The method according to embodiment C7, further comprising adjusting a ratio of the first filament relative to the second filament over a longitudinal distance to change the Shore durometer of the printed jacket over the longitudinal distance.

D1. A method for additive manufacturing of a medical catheter or lead, the method comprising:
securing a substrate via a clamp, wherein the clamp comprises a sleeve and a collar, and wherein the substrate extends through the sleeve and the collar is configured to compress the sleeve on the substrate;
feeding the substrate through a substrate channel in a heating cartridge, the substrate channel in fluid communication with an interior cavity of the heating cartridge;
feeding at least a first filament through a filament port into the interior cavity;
melting the first filament in the interior cavity; and
moving the heating cartridge relative to the substrate at least in a longitudinal direction to form a printed jacket comprising material from at least the first filament.

D2. The method according to embodiment D2, wherein the heating cartridge comprises an inlet die, a heating block, and an outlet die, wherein the inlet die defines a plurality of openings configured to receive a plurality of substrates, wherein the inlet die maintains spatial orientation of the plurality of substrates.

D3. The method according to any preceding D embodiment, wherein the collar defines an inner hole to receive the sleeve, and wherein securing the substrate via the clamp comprises sliding the collar along the sleeve to move at least a portion of the sleeve to compress the sleeve against the substrate and restrict movement of the sleeve relative to the substrate.

D4. The method according to any preceding D embodiment, wherein the sleeve comprises a deformable portion and a rigid portion arranged along a longitudinal axis, wherein securing the substrate via the clamp comprises sliding the collar onto the deformable portion and moving the deformable portion to compress the sleeve onto the substrate such that movement of the substrate relative to the sleeve is restricted.

D5. The method according to any preceding D embodiment, wherein the sleeve defines an increasing taper from an end of the sleeve, wherein the collar defines an inner hole having a fixed diameter, wherein securing the substrate via the clamp comprises sliding the collar over the sleeve from the end of the sleeve and compressing the sleeve as the collar moves further onto the sleeve.

D6. The method according to any preceding D embodiment, wherein the sleeve defines one or more slots such that at least a portion of the sleeve moves to compress on the substrate when the collar is slid over the sleeve.

D7. The method according to any preceding D embodiment, wherein the sleeve defines a plurality of openings to receive a plurality of substrates, wherein the sleeve maintains spatial orientation of the plurality of substrates.

D8. The method according to any preceding D embodiment, wherein the heating cartridge further defines a first filament port in fluid communication with the interior cavity to receive the first filament and a second filament port in fluid communication with the interior cavity to receive a second filament, wherein the method further comprises:
feeding the second filament through the second filament port into the interior cavity; and
melting the second filament in the interior cavity to form the printed jacket comprising material from the second filament.

D9. The method according to any preceding D embodiment, further comprising changing a feeding force applied to at least one of the first filament and the second filament to change a ratio of material in the printed jacket over a longitudinal distance.

D10. The method according to any preceding D embodiment, wherein the first filament has a Shore durometer less than or equal to 90A, 80A, 70A, 80D, 72D, 70D, 60D, 50D, 40D, or 35D.

Thus, various embodiments of ADDITIVE MANUFACTURING FOR MEDICAL DEVICES are disclosed. It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

All references and publications cited herein are expressly incorporated herein by reference in their entirety for all purposes, except to the extent any aspect directly contradicts this disclosure.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

As used herein, the term "configured to" may be used interchangeably with the terms "adapted to" or "structured to" unless the content of this disclosure clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed:

1. An additive manufacturing system for producing a medical catheter or lead, the system comprising:
    a heating cartridge extending from a proximal side to a distal side and comprising a substrate inlet port at the proximal side and a substrate outlet port at the distal side, the heating cartridge defining an interior volume and a substrate channel extending through the interior volume from the proximal side to the distal side, wherein the heating cartridge defines a first filament port in fluid communication with the interior volume to receive a first filament;
    a heating element thermally coupled to the heating cartridge to heat the interior volume;
    a filament handling system comprising one or more motors to feed at least the first filament through the first filament port into the interior volume;
    a substrate handling system comprising:
        a clamp configured to secure a distal portion of an elongate substrate, wherein the substrate is positioned to pass through the substrate channel when secured by the clamp, wherein the clamp comprises a sleeve and a collar, and wherein the elongate substrate extends through the sleeve and the collar is configured to compress the sleeve on the elongate substrate, and
        one or more motors to move one or both of the substrate when secured by the clamp and the heating cartridge relative to one another; and
    a controller operably coupled to the heating element, one or more motors of the filament handling system, and one or more motors of the substrate handling system, the controller configured to:
        activate the heating element to melt any portion of the first filament in the interior volume;
        control the one or more motors of the filament handling system to selectively control the feeding of the first filament into the interior volume; and
        control one or more motors of the substrate handling system to move one or both of the substrate and the heating cartridge relative to one another in at least a longitudinal direction to form a printed jacket around the substrate, wherein the printed jacket comprises material from the first filament.

2. The system of claim 1, wherein the heating cartridge comprises an inlet die, a heating block, and an outlet die, wherein the inlet die defines a plurality of openings configured to receive a plurality of substrates, wherein the inlet die maintains spatial orientation of the plurality of substrates.

3. The system of claim 1, wherein the collar defines an inner hole to receive the sleeve, and wherein the collar is configured to slide along the sleeve to move at least a portion of the sleeve to compress the sleeve against the substrate and restrict movement of the sleeve relative to the substrate.

4. The system of claim 1, wherein the sleeve comprises a deformable portion and a rigid portion arranged along a longitudinal axis, wherein the collar is configured to slide onto the deformable portion and move the deformable portion to compress the sleeve onto the substrate such that movement of the substrate relative to the sleeve is restricted.

5. The system of claim 1, wherein the sleeve defines an increasing taper from an end of the sleeve, wherein the collar defines an inner hole having a fixed diameter, wherein the collar is configured to slide over the sleeve from the end of the sleeve and compress the sleeve as the collar moves further onto the sleeve.

6. The system of claim 1, wherein the sleeve defines one or more slots such that at least a portion of the sleeve moves to compress on the substrate when the collar is slid over the sleeve.

7. The system of claim 1, wherein the sleeve defines a plurality of openings to receive a plurality of substrates, wherein the sleeve maintains spatial orientation of the plurality of substrates.

8. The system of claim 1, wherein the heating cartridge further defines a first filament port in fluid communication with the interior volume to receive the first filament and a second filament port in fluid communication with the interior volume to receive a second filament, wherein the one or more motors of the filament handling system is configured to feed the second filament through the second filament port into the interior volume, wherein the controller is configured to:
    activate the heating element to melt any portion of the second filament in the interior volume, and
    control the one or more motors of the filament handling system to selectively control the feeding of the second filament into the interior volume, wherein the printed jacket comprises material from the second filament.

9. The system of claim 8, wherein the controller is configured to change a feeding force applied to at least one of the first filament and the second filament to change a ratio of material in the printed jacket over a longitudinal distance.

10. The system of claim 1, wherein the first filament has a Shore durometer less than or equal to 90A, 80A, 70A, 80D, 72D, 70D, 60D, 50D, 40D, or 35D.

11. The system of claim 1, wherein the substrate outlet port of the heating cartridge defines an interior shoulder, wherein the controller is configured to vary at least one of: a longitudinal speed of the substrate relative to the heating cartridge, a feeding force applied to the first filament, and an amount of heat provided by the heating element to change a thickness of the printed jacket over a longitudinal distance.

12. A method for additive manufacturing of a medical catheter or lead, the method comprising:
   securing a substrate via a clamp, wherein the clamp comprises a sleeve and a collar, and wherein the substrate extends through the sleeve and the collar is configured to compress the sleeve on the substrate;
   feeding the substrate through a substrate channel in a heating cartridge, the substrate channel in fluid communication with an interior cavity of the heating cartridge;
   feeding at least a first filament through a filament port into the interior cavity;
   melting the first filament in the interior cavity; and
   moving the heating cartridge relative to the substrate at least in a longitudinal direction to form a printed jacket comprising material from at least the first filament.

13. The method of claim 12, wherein the heating cartridge comprises an inlet die, a heating block, and an outlet die, wherein the inlet die defines a plurality of openings configured to receive a plurality of substrates, wherein the inlet die maintains spatial orientation of the plurality of substrates.

14. The method of claim 12, wherein the collar defines an inner hole to receive the sleeve, and wherein securing the substrate via the clamp comprises sliding the collar along the sleeve to move at least a portion of the sleeve to compress the sleeve against the substrate and restrict movement of the sleeve relative to the substrate.

15. The method of claim 12, wherein the sleeve comprises a deformable portion and a rigid portion arranged along a longitudinal axis, wherein securing the substrate via the clamp comprises sliding the collar onto the deformable portion and moving the deformable portion to compress the sleeve onto the substrate such that movement of the substrate relative to the sleeve is restricted.

16. The method of claim 12, wherein the sleeve defines an increasing taper from an end of the sleeve, wherein the collar defines an inner hole having a fixed diameter, wherein securing the substrate via the clamp comprises sliding the collar over the sleeve from the end of the sleeve and compressing the sleeve as the collar moves further onto the sleeve.

17. The method of claim 12, wherein the sleeve defines one or more slots such that at least a portion of the sleeve moves to compress on the substrate when the collar is slid over the sleeve.

18. The method of claim 12, wherein the sleeve defines a plurality of openings to receive a plurality of substrates, wherein the sleeve maintains spatial orientation of the plurality of substrates.

19. The method of claim 12, wherein the heating cartridge further defines a first filament port in fluid communication with the interior cavity to receive the first filament and a second filament port in fluid communication with the interior cavity to receive a second filament, wherein the method further comprises:
   feeding the second filament through the second filament port into the interior cavity; and
   melting the second filament in the interior cavity to form the printed jacket comprising material from the second filament.

20. The method of claim 19, further comprising changing a feeding force applied to at least one of the first filament and the second filament to change a ratio of material in the printed jacket over a longitudinal distance.

21. The method of claim 12, further comprising
   positioning an electrical subassembly on the substrate, wherein the printed jacket covers at least a portion of the electrical subassembly and is spaced apart from the electrode ring; and
   removing the substrate from the printed jacket.

* * * * *